United States Patent
Choi

(10) Patent No.: US 9,520,047 B2
(45) Date of Patent: Dec. 13, 2016

(54) TERMINAL AND A METHOD OF CONTROLLING THE SAME BASED ON A STATE OF THE TERMINAL

(71) Applicant: SAMSUNG ELECTRONICS CO., LTD., Suwon-si (KR)

(72) Inventor: Jong-ho Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/813,698

(22) Filed: Jul. 30, 2015

(65) Prior Publication Data

US 2016/0035213 A1 Feb. 4, 2016

(30) Foreign Application Priority Data

Jul. 31, 2014 (KR) ........................ 10-2014-0098646
Nov. 4, 2014 (KR) ........................ 10-2014-0152084
Apr. 14, 2015 (KR) ........................ 10-2015-0052463

(51) Int. Cl.
| | | |
|---|---|---|
| G08B 21/00 | (2006.01) |
| G08B 21/24 | (2006.01) |
| H04L 29/06 | (2006.01) |
| H04W 12/12 | (2009.01) |
| H04W 4/02 | (2009.01) |
| H04W 4/20 | (2009.01) |

(52) U.S. Cl.
CPC ............ *G08B 21/24* (2013.01); *H04L 63/107* (2013.01); *H04W 12/12* (2013.01); *H04W 4/022* (2013.01); *H04W 4/023* (2013.01); *H04W 4/206* (2013.01)

(58) Field of Classification Search
CPC .................................................... G08B 21/24
USPC ...... 340/539.1, 539.11, 539.21, 539.23, 540; 455/39, 67.11; 709/217
See application file for complete search history.

(56) References Cited

U.S. PATENT DOCUMENTS

| | | | |
|---|---|---|---|
| 6,265,974 | B1 | 7/2001 | D'Angelo et al. |
| 8,725,842 | B1 | 5/2014 | Al-Nasser |
| 2009/0160643 | A1 | 6/2009 | Lizza |
| 2010/0203902 | A1 | 8/2010 | Wachter et al. |

(Continued)

FOREIGN PATENT DOCUMENTS

| | | |
|---|---|---|
| KR | 1020120065762 A | 6/2012 |
| KR | 1020130084743 A | 7/2013 |

(Continued)

OTHER PUBLICATIONS

Communication dated Nov. 11, 2015 issued by the International Searching Authority in counterpart International Application No. PCT/KR2015/007868 (PCT/ISA/220/210/237).

(Continued)

*Primary Examiner* — Jeffery Hofsass
(74) *Attorney, Agent, or Firm* — Sughrue Mion, PLLC

(57) ABSTRACT

A first terminal configured to operate in conjunction with a second terminal, the first terminal including: a sensor configured to obtain information corresponding to a motion of the first terminal; a communicator configured to receive information corresponding to a motion of the second terminal from the second terminal; and a controller configured to, in response to a distance between the first terminal and the second terminal being greater than or equal to a critical value, control the communicator to transmit a notification message to the second terminal based on the information corresponding to the motion of the first terminal and the information corresponding to the motion of the second terminal.

6 Claims, 35 Drawing Sheets

(56) References Cited

U.S. PATENT DOCUMENTS

2012/0169486 A1     7/2012   Sweeney et al.
2014/0045463 A1     2/2014   Hsieh et al.

FOREIGN PATENT DOCUMENTS

KR        101354625 B1    1/2014
WO      2014073971 A1    5/2014

OTHER PUBLICATIONS

Communication dated Jan. 20, 2016 issued by the European Patent Office in counterpart European Patent Application No. 15179291.8.

FIG. 15A

| FIRST STATE / SECOND STATE | MOTION IS DETECTED | MOTION IS NOT DETECTED |
|---|---|---|
| MOTION IS DETECTED | DISPLAY ALARM MESSAGE ON BOTH TERMINALS | SWITCH FIRST TERMINAL TO STANDBY MODE |
| MOTION IS NOT DETECTED | DISPLAY ALARM MESSAGE ON SECOND TERMINAL | RE-DETERMINE STATE |

FIG. 15B

| DISTANCE BETWEEN TWO TERMINALS | MOTION OF FIRST TERMINAL | MOTION OF SECOND TERMINAL | STATE OF FIRST TERMINAL | STATE OF SECOND TERMINAL |
|---|---|---|---|---|
| IS GREATER THAN CRITICAL VALUE | DETECTED | NOT DETECTED | STOLEN BY ANOTHER PERSON | PROVIDE LOSS / THEFT NOTIFICATION MESSAGE |
| | NOT DETECTED | DETECTED | USER LEAVES FIRST TERMINAL BEHIND AND MOVES | PROVIDE STANDBY MODE NOTIFICATION MESSAGE |
| | DETECTED | DETECTED | STOLEN BY ANOTHER PERSON | PROVIDE LOSS / THEFT NOTIFICATION MESSAGE |
| | NOT DETECTED | NOT DETECTED | RE-DETERMINE STATE | - |

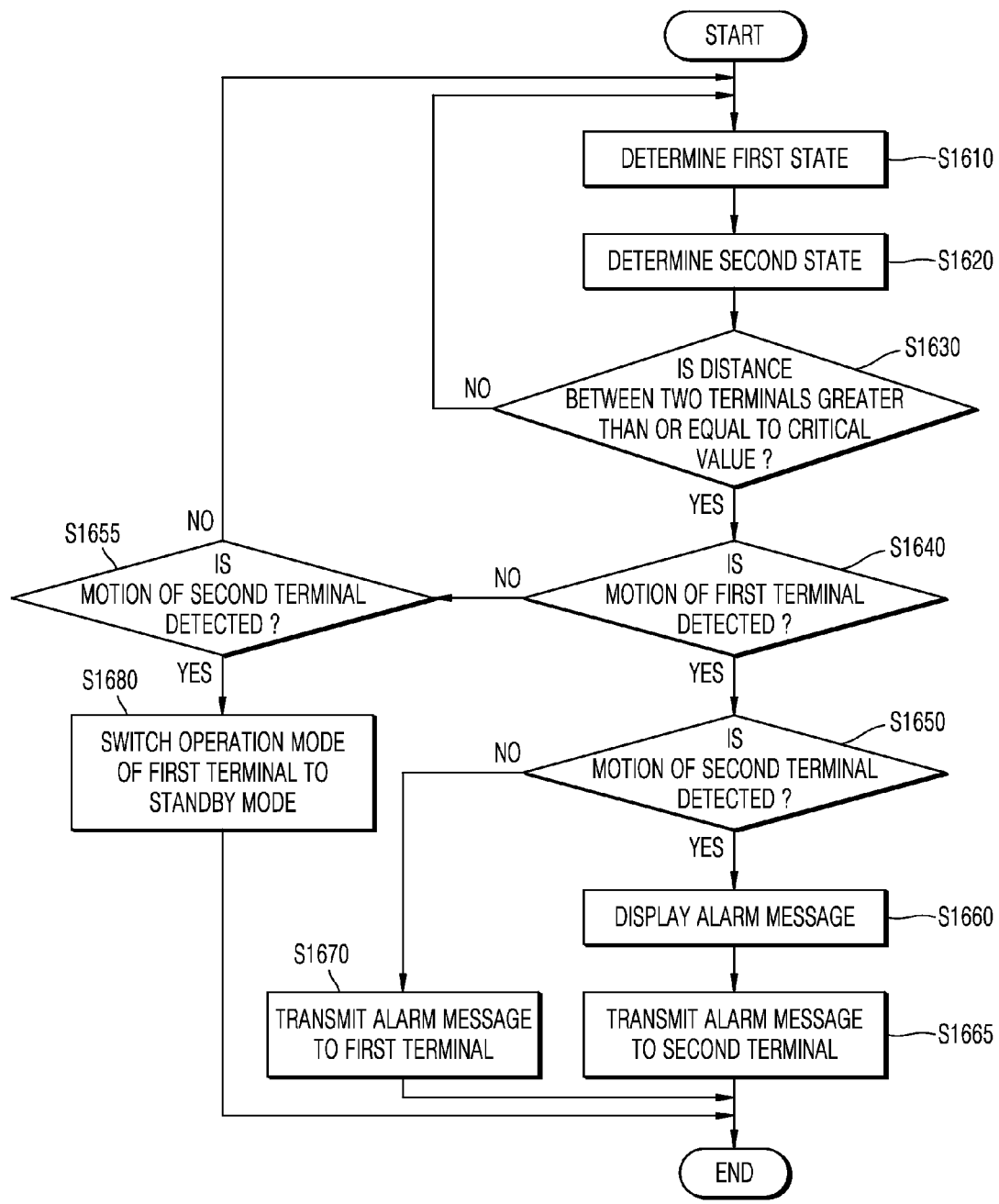

TERMINAL AND A METHOD OF CONTROLLING THE SAME BASED ON A STATE OF THE TERMINAL

CROSS-REFERENCE TO RELATED APPLICATIONS

This application claims the benefit of Korean Patent Application No. 10-2014-0098646, filed on Jul. 31, 2014 in the Korean Intellectual Property Office, Korean Patent Application No. 10-2014-0152084, filed on Nov. 4, 2014 in the Korean Intellectual Property Office, and Korean Patent Application No. 10-2015-0052463, filed on Apr. 14, 2015 in the Korean Intellectual Property Office, the disclosures of which are incorporated herein in their entireties by reference.

BACKGROUND

1. Field

Aspects of one or more exemplary embodiments relate to terminals and methods of controlling terminals, and more particularly, to methods in which terminals operate based on states between two or more terminals.

2. Description of the Related Art

As the types and sizes of terminals have varied, the number of users using a plurality of devices has increased. If a plurality of devices are used, various user experiences may be provided based on communication between the plurality of devices. For example, a device may transmit a message to another device.

Various sensors may be arranged in a terminal. Using the various sensors, the terminal may detect a state of the terminal and states of an environment surrounding the terminal.

Accordingly, it is desirable to provide more useful functions and various user experiences to a user using a plurality of terminals.

SUMMARY

Provided are methods of controlling terminals to perform more appropriate operations based on states of two terminals.

Additional aspects will be set forth in part in the description which follows and, in part, will be apparent from the description, or may be learned by practice of one or more exemplary embodiments.

According to an aspect of an exemplary embodiment, there is provided a first terminal configured to operate in conjunction with a second terminal, the first terminal including: a sensor configured to obtain information corresponding to a motion of the first terminal; a communicator configured to receive information corresponding to a motion of the second terminal from the second terminal; and a controller configured to, in response to a distance between the first terminal and the second terminal being greater than or equal to a critical value, control the communicator to transmit a notification message to the second terminal based on the information corresponding to the motion of the first terminal and the information corresponding to the motion of the second terminal.

The controller may be further configured to, in response to the information corresponding to the motion of the first terminal indicating that the first terminal is moving and the information corresponding to the motion of the second terminal indicating that the second terminal is not moving, control the communicator to transmit the notification message to the second terminal.

The communicator may be further configured to perform a short-distance wireless communication with the second terminal, and the controller may be further configured to determine the distance between the first terminal and the second terminal based on an intensity of a signal used for the short-distance wireless communication detected by the first terminal.

The communicator may be further configured to receive information corresponding to the distance between the first terminal and the second terminal from the second terminal, and the controller may be further configured to determine the distance between the first terminal and the second terminal by correcting the received information corresponding to the distance between the first terminal and the second terminal based on the intensity of the detected signal.

The controller may be further configured to, in response to the information corresponding to the motion of the first terminal indicating that the first terminal is not moving and the information corresponding to the motion of the second terminal indicating that the second terminal is moving, switch an operation mode of the first terminal to a standby mode.

The controller may be further configured to, in response to the distance being greater than or equal to the critical value and the first terminal receiving a designated input, control the communicator to transmit the notification message to the second terminal.

According to an aspect of another exemplary embodiment, there is provided a first terminal configured to operate in conjunction with a second terminal, the first terminal including: a sensor configured to obtain information corresponding to a motion of the first terminal; a communicator configured to receive information corresponding to a motion of the second terminal from the second terminal; a display configured to display a screen image; and a controller configured to, in response to a distance between the first terminal and the second terminal being greater than or equal to a critical value, control the display to display a notification message based on the information corresponding to the motion of the first terminal and the information corresponding to the motion of the second terminal.

The controller may be further configured to, in response to the information corresponding to the motion of the second terminal indicating that the second terminal is moving and the information corresponding to the motion of the first terminal indicating that the first terminal is not moving, control the display to display the notification message.

The controller may be further configured to control the display to display the notification message based on a result of comparing a moving direction of the first terminal indicated by the information corresponding to the motion of the first terminal to a moving direction of the second terminal indicated by the information corresponding to the motion of the second terminal.

According to an aspect of another exemplary embodiment, there is provided a second terminal configured to operate in conjunction with a first terminal, the second terminal including: a sensor configured to obtain information corresponding to a motion of the second terminal; a communicator configured to transmit the information corresponding to the motion of the second terminal to the first terminal and to receive information corresponding to an operation from the first terminal, the operation being determined based on the information corresponding to the motion of the second terminal; and a controller configured to perform an operation determined based on the received information.

According to an aspect of another exemplary embodiment, there is provided a method of controlling a first terminal capable of operating in conjunction with a second terminal, the method including: obtaining information corresponding to a motion of the first terminal; receiving information corresponding to a motion of the second terminal from the second terminal; and transmitting, in response to a distance between the first terminal and the second terminal being greater than or equal to a critical value, a notification message to the second terminal based on the information corresponding to the motion of the first terminal and the information corresponding to the motion of the second terminal.

The transmitting may include transmitting the notification message to the second terminal in response to the information corresponding to the motion of the first terminal indicating that the first terminal is moving and the information corresponding to the motion of the second terminal indicating that the second terminal is not moving.

The method may further include: performing a short-distance wireless communication with the second terminal; and determining the distance between the first terminal and the second terminal based on an intensity of a signal used for the short-distance wireless communication detected by the first terminal.

The transmitting may include transmitting the notification message to the second terminal in response to the determined distance being greater than or equal to the critical value.

The method may further include receiving information corresponding to the distance between the first terminal and the second terminal from the second terminal.

The determining the distance may include correcting the received information corresponding to the distance between the first terminal and the second terminal based on the intensity of the detected signal.

The method may further include switching, in response to the information corresponding to the motion of the first terminal indicating that the first terminal is not moving and the information corresponding to the motion of the second terminal indicating that the second terminal is moving, an operation mode of the first terminal to a standby mode.

The transmitting may include transmitting the notification message to the second terminal in response to the distance being greater than or equal to the critical value and the first terminal receiving a designated input.

According to an aspect of another exemplary embodiment, there is provided a method of controlling a first terminal capable of operating in conjunction with a second terminal, the method including: obtaining information corresponding to a motion of the first terminal; receiving information corresponding to a motion of the second terminal from the second terminal; and, outputting, in response to a distance between the first terminal and the second terminal being greater than or equal to a critical value, a notification message based on the information corresponding to the motion of the first terminal and the information corresponding to the motion of the second terminal.

The outputting may include displaying the notification message in response to the information corresponding to the motion of the second terminal indicating that the second terminal is moving and the information corresponding to the motion of the first terminal indicating that the first terminal is not moving.

The outputting may include displaying the notification message based on a result of comparing a moving direction of the first terminal indicated by the information corresponding to the motion of the first terminal to a moving direction of the second terminal indicated by the information corresponding to the motion of the second terminal.

According to an aspect of another exemplary embodiment, there is provided a method of controlling a second terminal capable of operating in conjunction with a first terminal, the method including: obtaining information corresponding to a motion of the second terminal; transmitting the information corresponding to the motion of the second terminal to the first terminal; receiving information corresponding to an operation from the first terminal, the operating being determined based on the information corresponding to the motion of the second terminal; and performing the operation based on the received information.

According to an aspect of another exemplary embodiment, there is provided a terminal including: a sensor configured to obtain information corresponding to a first state of the terminal; a communicator; and a controller configured to: control the communicator to establish a connection with another terminal, control the communicator to receive information corresponding to a second state of the another terminal from the another terminal, and perform an operation based on the first state and the second state.

The terminal may further include an input/output interface.

The controller may be further configured to control the input/output interface to output an audio signal.

The first state and the second state may indicate a change in a distance between the terminal and the another terminal, and the operation may include increasing a volume of the output audio signal in response to the first state and the second state indicating that the distance is increasing and decreasing the volume of the output audio signal in response to the first state and the second state indicating that the distance is decreasing.

The controller may be further configured to perform the operation based on the first state and the second state in response to a distance between the terminal and the another terminal being greater than a critical value.

The controller may be further configured to determine the critical value based on at least one of environmental information detected by the terminal or environmental information detected by the another terminal.

The terminal may further include a luminance sensor.

The controller may be further configured to determine the critical value based on an amount of ambient light sensed by the luminance sensor.

The controller may be further configured to perform the operation based on the first state and the second state in response to a distance between the terminal and the another terminal being greater than a critical value for a predetermined period of time.

The operation may include controlling the communicator to terminate the connection.

BRIEF DESCRIPTION OF THE DRAWINGS

These and/or other aspects will become apparent and more readily appreciated from the following description of certain exemplary embodiments, taken in conjunction with the accompanying drawings in which:

FIGS. 15A and 15B are diagrams for describing operations determined based on a first state and a second state;

FIG. 16 is a flowchart for describing a process in which a first terminal performs an operation based on a first state and a second state, according to an exemplary embodiment;

DETAILED DESCRIPTION

Figure 1:
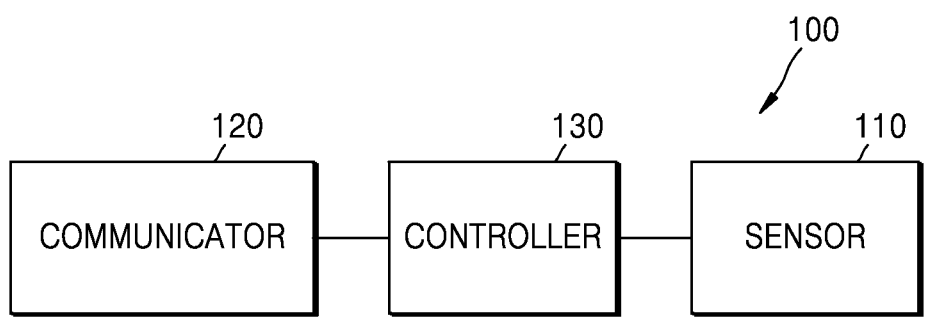
FIG. 1 is a block diagram of a first terminal according to an exemplary embodiment.

Hereinafter, certain exemplary embodiments will be described more fully with reference to the accompanying drawings. Exemplary embodiments may, however, be embodied in many different forms and should not be construed as limited to the certain exemplary embodiments set forth herein. Rather, the certain exemplary embodiments are provided so that this disclosure will be thorough and complete, and will fully convey the scope of one or more exemplary embodiments to those skilled in the art. In drawings, certain elements are omitted for clarity, and like reference numerals denote like elements throughout the specification. Expressions such as "at least one of," when preceding a list of elements, modify the entire list of elements and do not modify the individual elements of the list.

Throughout the specification, it will be understood that when a portion is referred to as being "connected to" another portion, it can be "directly connected to" the other portion or "electrically connected to" the other portion via another element. Furthermore, it will be further understood that the terms "includes," "including," "comprises," and/or "comprising" used herein specify the presence of stated features or components, but do not preclude the presence or addition of one or more other features or components.

Hereinafter, certain exemplary embodiments will be described in detail with reference to accompanying drawings.

FIG. 1 is a block diagram of a first terminal 100 according to an exemplary embodiment.

As shown in FIG. 1, the first terminal 100 may include a sensor 110, e.g., a sensor unit, a communicator 120, e.g., a communication unit, and a controller 130, e.g., a control unit. However, this is merely an example, and the first terminal 100 may be embodied with more alternate, additional, or fewer components than the components shown in FIG. 1. The first terminal 100 may be one of devices including a mobile phone, a smart phone, a tablet personal computer (PC), a laptop PC, an e-book terminal, a digital multimedia broadcasting (DMB) terminal, a personal digital assistant (PDA), a portable multimedia player (PMP), a navigation device, a TV, or a PC.

The sensor 110 may obtain first sensor information. The first sensor information refers to information regarding a state of the first terminal 100 or a state of an environment surrounding the first terminal 100, which is detected by the first terminal 100. For example, if the sensor 110 includes an acceleration sensor, the first sensor information may include an acceleration value generated as a physical motion of the first terminal 100 is detected. Configuration of the sensor 110 and the first sensor information may vary according to various exemplary embodiments.

Figure 3:
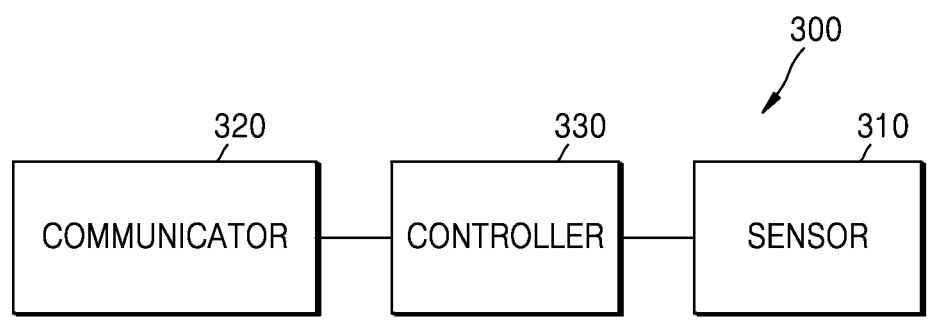
FIG. 3 is a block diagram of a second terminal according to an exemplary embodiment.

The communicator 120 may perform communication with a second terminal 300 of FIG. 3. For example, if the first terminal 100 and the second terminal 300 are located near each other, the communicator 120 may transmit or receive data to or from the second terminal 300 by using a short-distance wireless communication method. The communicator 120 may receive at least one of second sensor information and information regarding a second state from the second terminal 300. The second sensor information may refer to information regarding a state of the second terminal 300 or information regarding a state of an environment surrounding the second terminal 300, which is detected by the second terminal 300. For example, second sensor information may include an acceleration value obtained by detecting a physical motion of the second terminal 300 by using an acceleration sensor. The second state may indicate a state of the second terminal 300. For example, the second state may indicate whether the second terminal 300 is moving or whether a user is using the second terminal 300.

The controller 130 may control respective components of the first terminal 100 and process information for process operations of the first terminal 100. The controller 130 may determine a first state based on first sensor information. The first state may indicate a state of the first terminal 100. For example, the first state may indicate whether the first terminal 100 is moving or whether a user is using the first terminal 100. Furthermore, the controller 130 may determine a second state. The second state may be a state of the second terminal 300. When second sensor information is received by the communicator 120, the controller 130 may determine the second state based on the received second sensor information. Alternatively, if information regarding the second state is received by the communicator 120, the controller 130 may determine the second state based on the received information.

Furthermore, the controller 130 may determine a distance between the first terminal 100 and the second terminal 300. According to an exemplary embodiment, a distance between the first terminal 100 and the second terminal 300 may be determined based on a received signal strength indicator (RSSI) of a wireless frequency signal received by the communicator 120. For example, if an RSSI is from about −100 decibel-milliwatts (dBm) to about −80 dBm, the controller 130 may determine that the distance between the first terminal 100 and the second terminal 300 is about 2 m. Furthermore, as an RSSI becomes stronger, the controller 130 may determine that the distance between the first terminal 100 and the second terminal 300 decreases.

According to an exemplary embodiment, the communicator 120 may receive information regarding a distance between the first terminal 100 and the second terminal 300 from the second terminal 300. The information regarding the distance received from the second terminal 300 may include information regarding an RSSI detected by the second terminal 300 or a distance determined by the second terminal 300. The controller 130 may determine a more accurate distance by further reflecting information regarding a distance received from the second terminal 300. For example, the controller 130 may determine a distance between the first terminal 100 and the second terminal 300 based on an average RSSI, a distance detected by the first terminal 100, and an RSSI or a distance detected by the second terminal 300.

Furthermore, the controller 130 may determine an operation to perform based on both the first state and the second state and the distance between the first terminal 100 and the second terminal 300. Alternatively, the controller 130 may determine an operation to perform based on one of the first state and the second state and the distance between the first terminal 100 and the second terminal 300.

The controller 130 may perform a determined operation by controlling components of the first terminal 100. The determined operation may refer to a function that may be provided by the first terminal 100. For example, the determined operation may be displaying a message, transmitting information to another device, or switching an operation mode of the first terminal 100.

Figure 2:
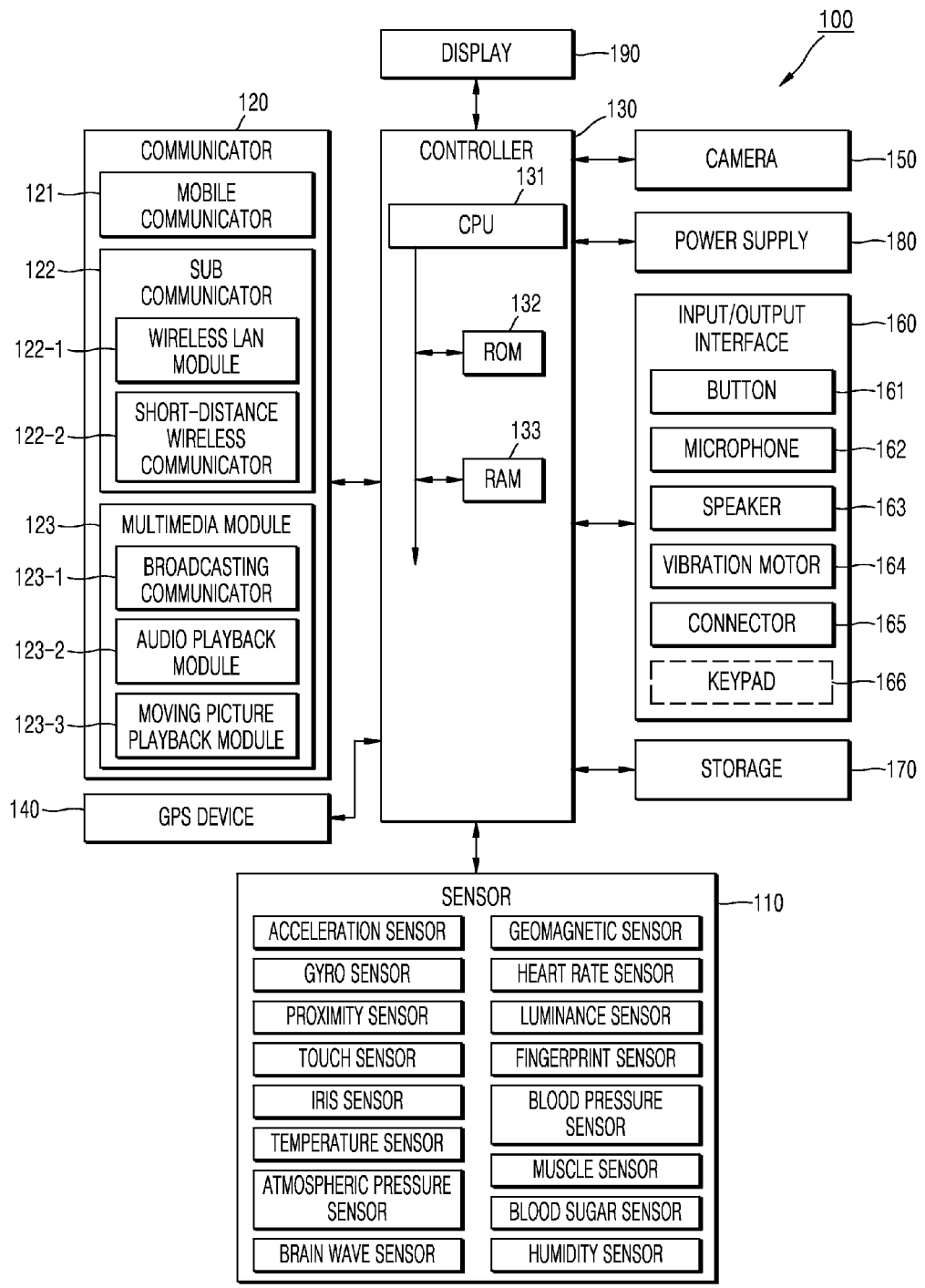
FIG. 2 is a block diagram of the first terminal according to an exemplary embodiment.

FIG. 2 is a block diagram of the first terminal 100 according to an exemplary embodiment. However, this is merely an example, and the first terminal 100 may be embodied with alternate, additional, or fewer components than shown in FIG. 2.

Referring to FIG. 2, the first terminal 100 may include the sensor 110, the communicator 120, the controller 130, a GPS device 140, e.g., a GPS module or GPS, a camera 150, e.g., a camera module, an input/output interface 160, e.g., an input/output module or a user interface, a storage 170, e.g., a storage unit, and a power supply 180, e.g., a power supply unit. The communicator 120 may include at least one of a mobile communicator 121, e.g., a mobile communication module, a sub communicator 122, e.g., a sub communication module, and a multimedia module 123. The sub communicator 122 may include at least one of a wireless LAN module 122-1 and a short-distance wireless communicator 122-2, e.g., a short-distance wireless communication module. The multimedia module 123 may include at least one of a broadcasting communicator 123-1, e.g., a broadcasting communication module, an audio playback module 123-2, and a moving picture playback module 123-3.

The sensor 110 may include at least one sensor. For example, a sensor module may include at least one of an acceleration sensor, a geomagnetic sensor, a gyro sensor, a heart rate sensor, a proximity sensor, a luminance sensor, a touch sensor, a fingerprint sensor, an iris sensor, a blood pressure sensor, a temperature sensor, a muscle sensor, an atmospheric pressure sensor, a blood sugar sensor, a brain wave sensor, and a humidity sensor. The acceleration sensor refers to a sensor capable of detecting an acceleration applied to the first terminal 100. The geomagnetic sensor may detect a direction of a geomagnetic field detected at the location of the first terminal 100. The gyro sensor may detect a rotating motion of the first terminal 100. The heart rate sensor may detect the heart rate of a user. The proximity sensor may detect a distance that an object is apart from the proximity sensor. The luminance sensor may detect the intensity of ambient light around the first terminal 100. The touch sensor may detect a contact of a touch material (e.g., a finger), and a location of the detected contact. The fingerprint sensor may detect information regarding a fingerprint of a user. The iris sensor may detect information regarding an iris of a user. The blood pressure sensor may detect a blood pressure of a user. The temperature sensor may detect a temperature inside or outside the first terminal 100. The muscle sensor may detect a movement of a muscle. The atmospheric pressure sensor may detect an atmospheric pressure around the first terminal 100. The blood sugar sensor may detect an amount of blood sugar included in blood, e.g., a blood sample. The brain wave sensor may detect a brain wave of a user by using, for example, an electrode or the like. The humidity sensor may detect humidity around the first terminal 100.

The communicator 120 may be connected to the second terminal 300 or an external device, such as an external server, by using at least one of the mobile communicator 121, the sub communicator 122, and the multimedia module 123.

The mobile communicator 121 may be controlled by the controller 130 to connect the first terminal 100 to an external device via a mobile communication using at least one or more antennas. The mobile communicator 121 may transmit/receive wireless signals for a voice call, a video call, a short message service (operation SMS), or a multimedia message service (MMS) to/from a mobile phone, a smart phone, a tablet PC, or any of various other devices corresponding to a phone number input to the first terminal 100.

The sub communicator 122 may include at least one of the wireless LAN module 122-1 and the short-distance wireless communicator 122-2. The sub communicator 122 may include only the wireless LAN module 122-1, only the short-distance wireless communicator 122-2, or both the wireless LAN module 122-1 and the short-distance wireless communicator 122-2.

The wireless LAN module 122-1 may be connected to a network, such as the Internet, or another device at a location where an access point (AP) is installed, under the control of the controller 130. The wireless LAN module 122-1 may support the wireless LAN specification (IEEE 802.11x) of the Institute of Electrical and Electronics Engineers (IEEE). The short-distance wireless communicator 122-2 may perform short-distance wireless communication between the first terminal 100 and the second terminal 300 under the control of the controller 130. Wireless short-distance wireless communication methods may include Bluetooth™, infrared data association (IrDA), near field communication (NFC), or ZigBee.

According to an exemplary embodiment, the controller 130 may determine a distance between the first terminal 100 and the second terminal 300 based on an RSSI of a wireless frequency signal received by the short-distance wireless communicator 122-2. For example, the second terminal 300 may generate a wireless frequency signal for a wireless short-distance wireless communication of a pre-set intensity (e.g., 21 dB), and the first terminal 100 may measure intensity of a received wireless frequency signal. The controller 130 of the first terminal 100 may determine a distance d between the first terminal 100 and the second terminal 300 according to Equation 1 below based on the measured intensity of the wireless frequency signal.

$$d = \frac{\lambda}{4\pi} \cdot 10^{\frac{L}{20}} = \frac{c}{4\pi f} \cdot 10^{\frac{L}{20}} \qquad \text{[Equation 1]}$$

In equation 1, c denotes a propagation rate, f denotes a frequency, and L denotes a loss of signal intensity. The propagation rate of a wireless signal in the air has a constant value. The frequency is a frequency designated for performing a short-distance wireless communication. Furthermore, the loss of signal intensity may be obtained based on a difference between the intensity of a wireless frequency signal generated by the second terminal 300 and intensity of a received wireless frequency signal. Therefore, the controller 130 may determine the distance d between the first terminal 100 and the second terminal 300 according to Equation 1 above.

Based on the performance of the first terminal 100, the first terminal 100 may include at least one of the mobile communicator 121, the sub communicator 122, and the short-distance wireless communicator 122-2.

The multimedia module 123 may include at least one of the broadcasting communicator 123-1, the audio playback module 123-2, and the moving picture playback module 123-3. The broadcasting communicator 123-1 may receive a broadcasting signal (e.g., a TV broadcasting signal, a radio broadcasting signal, or a data broadcasting signal) and additional broadcasting information (e.g., an electric program guide (EPG) or an electric service guide (ESG)) transmitted by a broadcasting station via a broadcasting communication antenna, under the control of the controller 130. The audio playback module 123-2 may playback a stored or received digital audio file under the control of the controller 130. The moving picture playback module 123-3 may playback a digital moving picture file, e.g., a video file.

The multimedia module 123 may not include the broadcasting communicator 123-1, but may only include the audio playback module 123-2 and the moving picture playback module 123-3. Furthermore, the audio playback module 123-2 or the moving picture playback module 123-3 may be included in the controller 130.

The controller 130 may include a central processing unit (CPU) 131, read-only memory (ROM) 132 having stored therein a control program for controlling the first terminal 100, and random-access memory (RAM) 133, which stores a signal or data output from outside the first terminal 100 or is used as a memory space in the first terminal 100 so as to perform a task. The CPU 131 may include a single core or a plurality of cores, may be a single core, dual core (two cores), triple core (three cores), and quad cores (four cores) processor. The CPU 131, the ROM 132, and the RAM 133 may be connected to one another via an internal bus.

The controller 130 may control the communicator 120, the camera 150, the GPS device 140, the input/output interface 160, the sensor 110, the storage 170, the power supply 180, and a display 190, e.g., a display unit.

The GPS device 140 may receive radio wave signals from a plurality of GPS satellites on the Earth's orbit and calculate a location of the first terminal 100 based on a time that a signal arrives from the GPS satellites at the first terminal 100.

The input/output interface 160 may include at least one of a button 161, a microphone 162, a speaker 163, a vibration motor 164, a connector 165, and a keypad 166.

The button 161 may be formed on the front surface, side surfaces, or the rear surface of the housing of the first terminal 100 and may include at least one of a power/lock button, a volume button, a menu button, a home button, a back button, and a search button.

The microphone 162 may receive a voice or a sound and generate an electric signal under the control of the controller 130.

The speaker 163 may output sounds corresponding to various signals received from the mobile communicator 121, the sub communicator 122, the multimedia module 123, or the camera 150.

The vibration motor 164 may transform an electric signal to a mechanical vibration under the control of the controller 130. For example, when the first terminal 100 set to a vibration mode receives a voice call from another device, the vibration motor 164 may be operated. If the display 190 includes a touch screen, the vibration motor 164 may be operated in response to a user touch on the touch screen or successive motions of a touch input on the touch screen.

The connector 165 may be used as an interface for interconnecting the first terminal 100 and an external device or a power source. Under the control of the controller 130, data stored in the storage 170 of the first terminal 100 may be transmitted to an external device or data may be received from an external device via a cable connected to the connector 165. Power may be input from a power source, or a battery may be charged via a cable connected to the connector 165.

The keypad 166 may receive a key input for controlling the first terminal 100 from a user. The keypad 166 may include a physical keypad formed at the first terminal 100, or a virtual keypad displayed at the display 190. A physical keypad formed at the first terminal 100 may be omitted according to performance or structure of the first terminal 100.

The storage 170 may store signals or data input/output in correspondence to operations of the mobile communicator 121, the sub communicator 122, the multimedia module 123, the camera 150, the GPS device 140, the input/output interface 160, the sensor 110, and the display 190, under the control of the controller 130. The storage 170 may store control programs and applications for controlling the first terminal 100 or the controller 130.

The term "storage" may include the storage 170, the ROM 132 and the RAM 133 in the controller 130, or a memory card attached to the first terminal 100. The storage 170 may include a non-volatile memory, a volatile memory, a hard disk drive (HDD), or a solid state drive (operation SSD).

The power supply 180 may supply power to at least one battery arranged in the housing of the first terminal 100, under the control of the controller 130. Furthermore, the power supply 180 may supply power, which is input from an external power source via a cable connected to the connector 165, to the respective components of the first terminal 100.

The display 190 may output user interfaces and information corresponding to various services to a user. The display 190 may include a liquid crystal display (LCD), a plasma display panel (PDP), a transparent display, or a flexible display capable of displaying an image. Furthermore, the display 190 may include a touch screen. A touch screen may generate an analog signal corresponding to at least one touch input to a user interface. A touch screen may receive at least one touch input via a body part of a user (e.g., a finger) or a touch input unit (e.g., a stylus pen). A touch screen may receive successive motions of at least one touch input.

A touch input is not limited to an input based on a contact between a touch screen and a body part of a user or a touch input unit and may include a non-contact input (e.g., an input based on a distance between a touch screen and a body part being less than or equal to 1 mm). A distance that may be detected by a touch screen may vary according to one or more exemplary embodiments of the first terminal 100. A touch screen may be embodied as a resistive type, a capacitive type, an infrared type, or an ultrasound wave type.

The display 190 may transform an analog signal generated by a touch screen into a digital signal (e.g., an X coordinate and a Y coordinate) and transmit the digital signal to the controller 130. The controller 130 may receive a digital signal, which is received from the display 190, as a user input.

FIG. 3 is a block diagram of the second terminal 300 according to an exemplary embodiment.

As shown in FIG. 3, the second terminal 300 may include the sensor 310, the communicator 320, and the controller 330. However, according to one or more exemplary embodiments, the second terminal device 300 may include alternate or additional components, or may not include all of the components shown in FIG. 3. The second terminal 300 may be, as non-limiting examples, a wearable device, such as a smart watch and smart glasses, a mobile phone, a smart phone, a tablet PC, a laptop PC, an e-book terminal, a digital multimedia broadcasting (DMB) terminal, a personal digital assistant (PDA), a portable multimedia player (PMP), a navigation device, a TV, or a PC.

The sensor 310 may obtain second sensor information. The second sensor information refers to information regarding a state of the second terminal 300 or a state of an environment surrounding the second terminal 300, which is detected by the second terminal 300. For example, if the sensor 310 includes an acceleration sensor, the second sensor information may include an acceleration value generated as a physical motion of the second terminal 300 is detected. Configuration of the sensor 310 and the second sensor information may vary according to various exemplary embodiments.

The communicator 320 may perform communication with the first terminal 100 of FIG. 1. For example, if the first terminal 100 and the second terminal 300 are located near each other, the communicator 320 may transmit or receive data to or from the first terminal 100 by using a short-distance wireless communication method. The communicator 320 may transmit at least one of second sensor information and information regarding a second state to the first terminal 100. The second sensor information may refer to information regarding a state of the second terminal 300 or information regarding a state of an environment surrounding the second terminal 300, which is detected by the second terminal 300. For example, second sensor information may include an acceleration value obtained by detecting a physical motion of the second terminal 300 by using an acceleration sensor. The second state may indicate a state of the second terminal 300. For example, the second state may indicate whether the second terminal 300 is moving or whether a user is using the second terminal 300.

The controller 130 may control respective components of the second terminal 300 and process information for the second terminal 300 to process operations. According to an exemplary embodiment, the controller 330 may determine a second state based on the second sensor information. The second state may indicate a state of the second terminal 300. For example, the second state may indicate whether the second terminal 300 is moving or whether a user is using the second terminal 300. According to another exemplary embodiment. The second terminal 300 may transmit the second sensor information obtained via the sensor 310 to the first terminal 100 or an external server as raw data via the communicator 320, and the first terminal 100 or the external server which receives the second sensor information may determine the second state.

Furthermore, the controller 330 may determine a distance between the first terminal 300 and the second terminal 300. According to an exemplary embodiment, a distance between the first terminal 300 and the second terminal 300 may be determined based on a received signal strength indicator (RSSI) of a wireless frequency signal received by the communicator 320. For example, if an RSSI is from about −100 dBm to about −80 dBm, the controller 330 may determine that the distance between the first terminal 300 and the second terminal 300 is about 2 m. Furthermore, if an RSSI becomes stronger, the controller 330 may determine that the distance between the first terminal 300 and the second terminal 300 decreases. The communicator 320 may transmit information regarding the distance between the first terminal 100 and the second terminal 300 determined by the controller 330 to the first terminal 100.

Furthermore, the communicator 320 may receive information regarding an operation, which is determined based on the information regarding the second state transmitted to the second terminal 300, from the first terminal 100. As the information regarding the operation determined based on the information regarding the second state is received, the controller 330 may perform an operation corresponding to the received information. For example, if an alarm message is received from the first terminal 100, the second terminal 300 may output the received alarm message.

Figure 4:
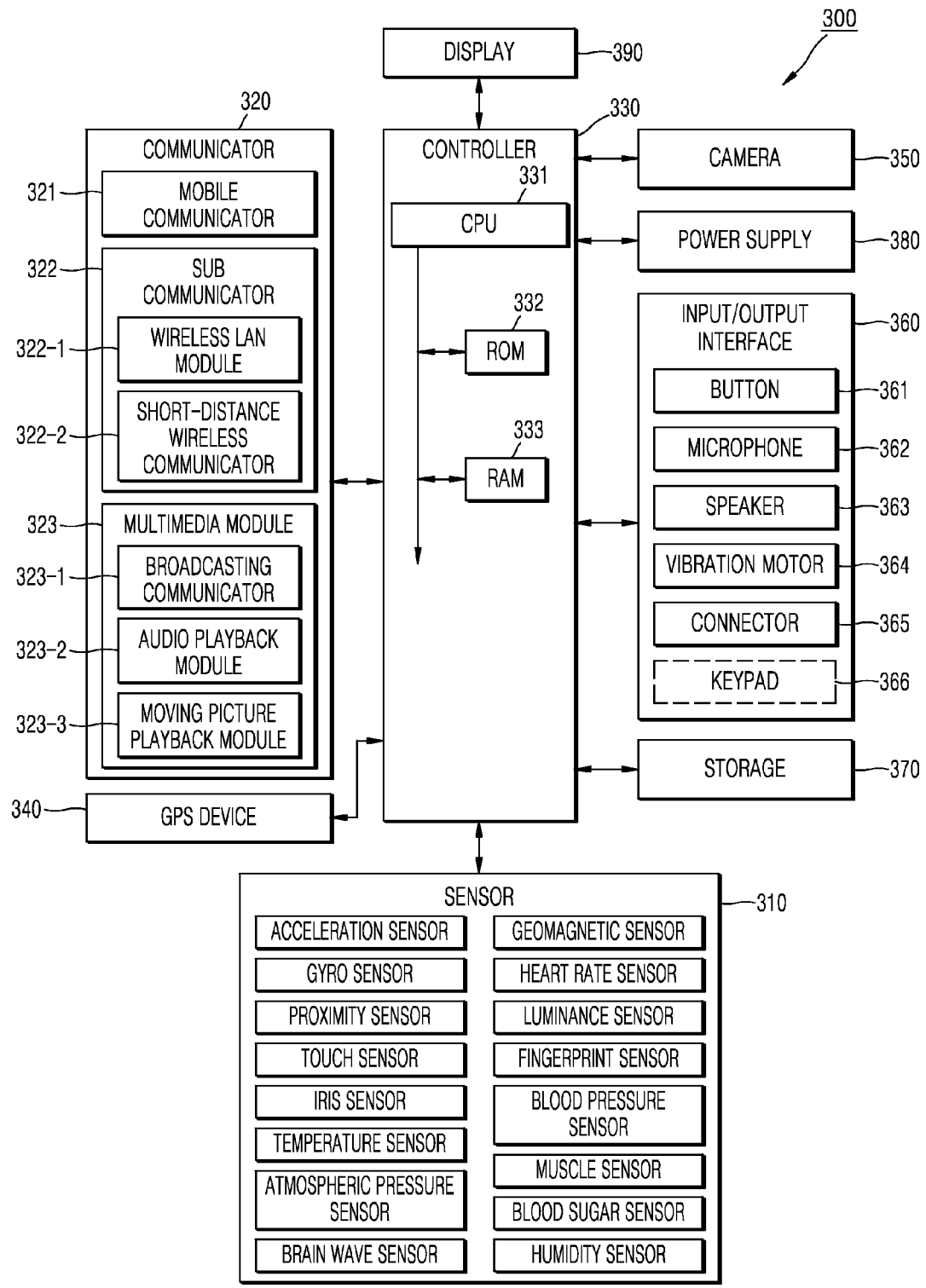
FIG. 4 is a block diagram of the second terminal according to an exemplary embodiment.

FIG. 4 is a block diagram of the second terminal 300 according to an exemplary embodiment. The second terminal 300 may be embodied with additional, alternate, or fewer components than the components shown in FIG. 4.

Referring to FIG. 4, the second terminal 300 may include the sensor 310, the communicator 320, the controller 330, a GPS device 340, a camera 350, an input/output interface 360, a storage 370, and a power supply 380. The communicator 320 may include at least one of a mobile communicator 321, a sub communicator 322, and a multimedia module 323. The sub communicator 322 may include at least one of a wireless LAN module 322-1 and a short-distance wireless communicator 322-2. The multimedia module 323 may include at least one of a broadcasting communicator 323-1, an audio playback module 323-2, and a moving picture playback module 323-3. The input/output interface 360 may include at least one of a button 361, a microphone 362, a speaker 363, a vibration motor 364, a connector 365, and a keypad 366.

The sensor 310 may include at least one sensor. For example, a sensor module may include at least one of an acceleration sensor, a geomagnetic sensor, a gyro sensor, a heart rate sensor, a proximity sensor, a luminance sensor, a touch sensor, a fingerprint sensor, an iris sensor, a blood pressure sensor, a temperature sensor, a muscle sensor, an atmospheric pressure sensor, a blood sugar sensor, a brain wave sensor, and a humidity sensor.

The multimedia module 323 may include at least one of the broadcasting communicator 323-1, the audio playback module 323-2, and the moving picture playback module 323-3.

The controller 330 may include a CPU 331, ROM 332 having stored therein a control program for controlling the second terminal 300, and RAM 333, which stores a signal or data output from outside the second terminal 300 or is used as a memory space in the second terminal 300 so as to perform a task.

The various components of the second terminal 300 may have similar structures and functions to the corresponding components of the first terminal device 100 described with reference to FIG. 2.

Figure 5:
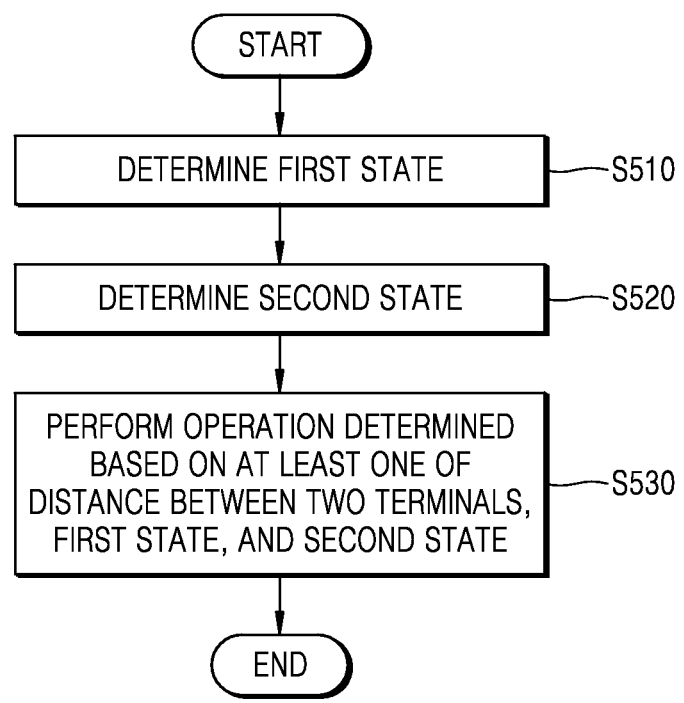
FIG. 5 is a flowchart showing a process of controlling the first terminal according to an exemplary embodiment.

FIG. 5 is a flowchart showing a process of controlling the first terminal 100 according to an exemplary embodiment.

First, the first terminal 100 may establish communication, e.g., a connection, with the second terminal 300. For example, the first terminal 100 may be paired with the second terminal 300 to perform Bluetooth communication with the second terminal 300. A 'paired state' may refer to a state in which two devices recognized each other for performing communication.

The first terminal 100 may determine a first state indicating a state of the first terminal 100 (operation S510). In the operation S510, the first terminal 100 may obtain first sensor information by using a sensor and determine a first state corresponding to the first sensor information. For example, if the first sensor information includes an acceleration value, the controller 130 of the first terminal 100 may determine whether the first terminal 100 is moving based on the acceleration value. The controller 130 may determine the first state not only based on an acceleration value corresponding to a time point at which the first state is determined, but also acceleration values accumulated over a set time period. For example, if an average of acceleration values for 10 seconds is greater than or equal to a critical value, the controller 130 may determine that the first terminal 100 is moving.

Furthermore, the first terminal 100 may determine a second state indicating a state of the second terminal 300 (operation S520). In the operation S520, the first terminal 100 may receive second sensor information or information regarding the second state from the second terminal 300. If the second sensor information is received from the second terminal 300, the first terminal 100 may determine the second state in a manner similar to that of the operation S510. Alternatively, if information regarding the second state is received, the first terminal 100 may determine the second state without performing a separate process of determining the second state. The first terminal 100 may receive second sensor information as the second sensor information is generated or may generate information regarding a second state that is generated at a constant cycle. The first terminal 100 may continuously, quasi-continuously, regularly, periodically, or sporadically receive the second sensor information from the second terminal 300.

The first state and the second state may indicate various states of the first terminal 100 and the second terminal 300 according to various exemplary embodiments, respectively. For example, the first state and the second state may indicate whether the first terminal 100 and the second terminal 300 are possessed by or worn by a moving user. In another example, the first state and the second state may also indicate whether a person who owns the first terminal 100 and the second terminal 300 is a driver or a passenger. For example, moving speeds of GPS coordinates of the first terminal 100 and the second terminal 300 may be included in a range indicating that a user is in a car. For example, if the second terminal 300 is a smart watch worn on a wrist, whether a user is a driver or a passenger may be determined based on whether a motion detected by the second terminal 300 via the sensor 310 is a motion for operating a steering wheel.

Next, the controller 130 of the first terminal 100 may perform an operation determined based on at least one of a distance between the first terminal 100 and the second terminal 300, the determined first state, and the determined second state (operation S530). The first terminal 100 may determine the distance between the first terminal 100 and the second terminal 300 by using various methods according to various exemplary embodiments. For example, the first terminal 100 may determine the distance between the first terminal 100 and the second terminal 300 based on an RSSI of a wireless frequency signal used for a short-distance wireless communication with the second terminal 300. The first terminal 100 may improve accuracy of the determined distance by further reflecting distance information received from the second terminal 300. In another example, the first terminal 100 may determine the distance between the first terminal 100 and the second terminal 300 by using a GPS coordinate of the first terminal 100 obtained by the GPS device 140 and a GPS coordinate of the second terminal 300 obtained by the GPS device 340.

Operations to be performed by the first terminal 100 may vary according to various exemplary embodiments. According to another exemplary embodiment, the first terminal 100 may provide a function for preventing loss of a terminal based on the operation performed in the operation S530. If the first terminal 100 is a smart phone and the second terminal 300 is a wearable device, a loss/theft notification message may be provided to a user as a distance between the first terminal 100 and the second terminal 300 becomes greater than or equal to a critical value. For example, if the first state indicates that the first terminal 100 is not moving and the second state indicates that a user is wearing the second terminal 300 and the second terminal 300 is moving, the first terminal 100 may determine that a user is moving and the first terminal 100 was left behind. Therefore, as a distance between the first terminal 100 and the second terminal 300 becomes greater than a critical value, the first terminal 100 may be set in a standby mode so as to reduce power consumption by the first terminal 100.

Furthermore, if the first state indicates that the first terminal 100 is moving and the second state indicates that a user is wearing the second terminal 300, the first terminal 100 may determine that, if a distance between the first terminal 100 and the second terminal 300 becomes greater than a critical value, the first terminal 100 is stolen. For example, the second state may indicate that the second terminal 300, which is a wearable device, is worn by a user and is moving in a direction, whereas the first state may indicate that the first terminal 100 is moving in another direction. In this case, if the distance between the first terminal 100 and the second terminal 300 becomes greater than or equal to a critical value (e.g., 3 m), the first terminal 100 may be determined to be stolen. In another example, the first state may be a result of analyzing motions of the first terminal 100, whereas the second state may be a result of analyzing motions of the second terminal 300. If the second state indicates that the second terminal 300, which is a wearable device, is not moving and the first state indicates that a user of the first terminal 100 is walking, the first terminal 100 may be determined to be stolen. However, one or more exemplary embodiments are not limited thereto.

If the first terminal 100 is determined to be stolen, the first terminal 100 may transmit a theft notification message to the second terminal 300 and may execute a data protection mode for protecting data stored in the first terminal 100.

The first state and the second state may also indicate whether a user is walking or stopped. In this case, the first terminal 100 may determine whether the user is walking by using a pattern regarding acceleration values, for example. For example, the first terminal 100 may determine whether the user is walking based on a size, a direction, and a cycle of repeated acceleration values. In detail, if the first sensor information or the second sensor information includes a pattern that similar changes of acceleration values are periodically repeated in an arbitrary section and a result of analysis regarding the entire arbitrary section indicates that the location of a terminal has changed, the first terminal 100 may determine that a person possessing the first terminal 100 or the second terminal 300 is walking. Furthermore, if the size of a repeating pattern and a speed at which the location of a terminal has changed are greater than those corresponding to the case that the person possessing the first terminal 100 or the second terminal 300 is walking, the first terminal 100 may determine that the person possessing the first terminal 100 or the second terminal 300 is running. However, one or more exemplary embodiments are not limited thereto.

According to another exemplary embodiment, the first terminal 100 may determine an operation to perform based on a speed at which a distance between the first terminal 100 and the second terminal 300 is changed and perform the determined operation. For example, if a distance between the first terminal 100 and the second terminal 300 increases at a speed greater than or equal to a critical value, the first terminal 100 may perform an operation for storing backup data or other operations for preparing for a shock to the first terminal 100. In other words, if a user drops the first terminal 100, a distance between the first terminal 100 and the second terminal 300 increases very fast. Therefore, in this case, the first terminal 100 may perform an operation corresponding to a state that the user dropped the first terminal 100. In another example, a distance between the first terminal 100 and the second terminal 300 may rapidly increase, and the first state determined based on first sensor information obtained via an acceleration sensor may indicate that a significant amount of shock is applied to the first terminal 100. In this case, the first terminal 100 may determine that the user dropped the first terminal 100 and transmit a notification message notifying that the user dropped the first terminal 100 to the second terminal 300. The user may recognize that he or she dropped the first terminal 100 based on the notification message displayed on the second terminal 300. Therefore, the user may be prevented from losing the first terminal 100. However, one or more exemplary embodiments are not limited thereto.

A critical value is not limited to a particular value, and a particular range may also be referred to as a critical value. For example, a critical value may be 2 m, or a range from 1.5 m to 2.5 m may be a critical value.

Furthermore, a condition that a distance between two terminals is greater than or equal to a critical value may include various conditions. For example, a condition that a distance between two terminals is greater than or equal to a critical value may include a condition that the signal intensity between the two terminals is less than or equal to a critical value. Furthermore, the condition that a distance between two terminals is greater than or equal to a critical value may include a condition that a loss of signal intensity obtained based on a difference between the intensity of a wireless frequency signal generated by the second terminal 300 and the intensity of a received wireless frequency signal is greater than or equal to a critical value. In other words, even if a distance between two terminals is not directly obtained based on a calculation, if the distance between the two terminals is determined to be greater than or equal to a critical value based on variables (e.g., L of Equation 1) used for calculating the distance between the two terminals, the determination based on the variables may be one for determining if the distance between the two terminals is greater than or equal to the critical value.

According to another exemplary embodiment, the first terminal 100 may provide a function for preventing a child from being lost based on the operation performed in the operation S530. If the second terminal 300 is a wearable device, a user may attach the second terminal 300 to a child, and the user, who is a parent of the child, may possess the first terminal 100. If a distance between the first terminal 100 and the second terminal 300 is greater than a critical value and the second state indicates that the second terminal 300 is not moving, the first terminal 100 may not perform any operation. However, if the first state indicates that the first terminal 100 is not moving and the second state indicates that the second terminal 300 is moving, the first terminal 100 may output an alarm. Furthermore, if the first state and the second state indicate that the first terminal 100 and the second terminal 300 are moving in different directions, the first terminal 100 may output an alarm.

According to another exemplary embodiment, the first terminal 100 may perform an advanced synchronization based on the operation performed in the operation S530. The term 'advanced synchronization' may refer to an operation in which the first terminal 100 continuously or periodically updates a state of the second terminal 300. For example, if the first state indicates that the first terminal 100 is not moving, the second state indicates that the second terminal 300 is moving, and a distance between the first terminal 100 and the second terminal 300 decreases to a distance less than a critical value, the first terminal 100 may initiate an advanced synchronization. In other words, as a user possessing the second terminal 300 approaches to the stationary first terminal 100, the first terminal 100 may initiate an advanced synchronization. Alternatively, if the first state indicates that the user possessing the second terminal 300 holds the first terminal 100 for a display of the first terminal 100 to face the user, the first terminal 100 may initiate an advanced synchronization. Whether the user is holding the first terminal 100 may be determine based on whether a touch input is received by a touch sensor of the first terminal 100. Furthermore, whether the user is holding the first terminal 100 such that the display of the first terminal 100 to face the user may be determined based on whether information regarding a rotation of the first terminal 100 detected via a gyro sensor is included in the first sensor information. Alternatively, whether the user is holding the first terminal 100 such that the display of the first terminal 100 faces the user may be determined based on whether information obtained via a motion recognition for recognizing a user's motion of facing the display of the first terminal 100 is included in the first sensor information.

According to another exemplary embodiment, the first terminal 100 may maintain or terminate a communication established between the first terminal 100 and the second terminal 300 based on the operation performed in the operation S530. For example, if a distance between the first terminal 100 and the second terminal 300 greater than a critical value is maintained for a set period of time, a communication between the first terminal 100 and the second terminal 300 may be maintained or terminated based on the second state. If the second state indicates that a user possesses or wears the second terminal 300, the first terminal 100 may maintain a communication to the second terminal 300. However, if the second state indicates that a user is not possessing or wearing the second terminal 300, the first terminal 100 may terminate a communication to the second terminal 300.

The second state indicating whether the user possesses or wears the second terminal 300 may be determined by using various methods according to various exemplary embodiments. For example, if biometric information regarding the user is obtained via sensors for obtaining biometric information of the user, such as a heart rate sensor, a fingerprint sensor, an iris sensor, a brain wave sensor, and a temperature sensor included in the second terminal 300, the second terminal 300 may determine that the user has the second terminal 300 on or is wearing the second terminal 300. In other words, if heart rate information, fingerprint information, iris information, brain wave information, or body temperature information of the user is obtained via the sensor 310, the second terminal 300 may determine that the user has the second terminal 300 on or is wearing the second terminal 300. In another example, if a contact of a user is detected via a touch sensor included in the second terminal 300 as the user holds the second terminal 300, the second terminal 300 may determine that the user has the second terminal 300 on or is wearing the second terminal 300. However, one or more exemplary embodiments are not limited thereto.

In another example, the first terminal 100 may control a volume of sounds output from the speaker 163 or an intensity of vibration generated by the vibration motor 164 based on a distance between the first terminal 100 and the second terminal 300 in the operation S530. For example, the volume output from the speaker 163 may be increased as the distance between the first terminal 100 and the second terminal 300 increases. In detail, the second terminal 300 may be a wearable device, such as a smart watch, whereas the first terminal 100 may be a device capable of playing back audio contents, such as a TV. If a user wears the second terminal 300 and moves away from the stationary first terminal 100 while the first terminal 100 is playing back audio contents, the first terminal 100 may increase the volume of the audio content as the distance between the first terminal 100 and the second terminal 300 increases. In another example, the first terminal 100 may be a portable device, such as a smart phone, whereas the second terminal 300 may be a wearable device, such as a smart watch. The second state regarding the second terminal 300 worn by a user indicates that the second terminal 300 is not moving and the first state regarding the first terminal 100 indicates that the first terminal 100 is moving, the second terminal 300 may generate vibration by using the vibration motor 364 to notify the user of a possible loss of the first terminal 100. The second terminal 300 may increase intensity of vibration as a distance between the first terminal 100 and the second terminal 300 increases. However, one or more exemplary embodiments are not limited thereto.

According to another exemplary embodiment, in the operation S530, the first terminal 100 may perform an operation determined based on the distance between the first terminal 100 and the second terminal 300 and the first state. For example, when the distance between the first terminal 100 and the second terminal 300 is greater than or equal to a critical value and the first state indicates that a shock is applied to the first terminal 100, the first terminal 100 may determine that the first terminal 100 is dropped on the ground. In detail, a state of the first terminal 100 may be determined via shock detecting sensors of the first terminal 100, such as an acceleration sensor, a pressure sensor, and a piezo sensor. Since methods for determining a state of the first terminal 100 to which shock is applied are obvious to one of ordinary skill in the art, detailed descriptions thereof will be omitted.

When the first terminal 100 is determined to be dropped on the ground, the first terminal 100 may transmit a notification message notifying the user that the first terminal 100 is dropped on the ground to the second terminal 300.

Figure 6:
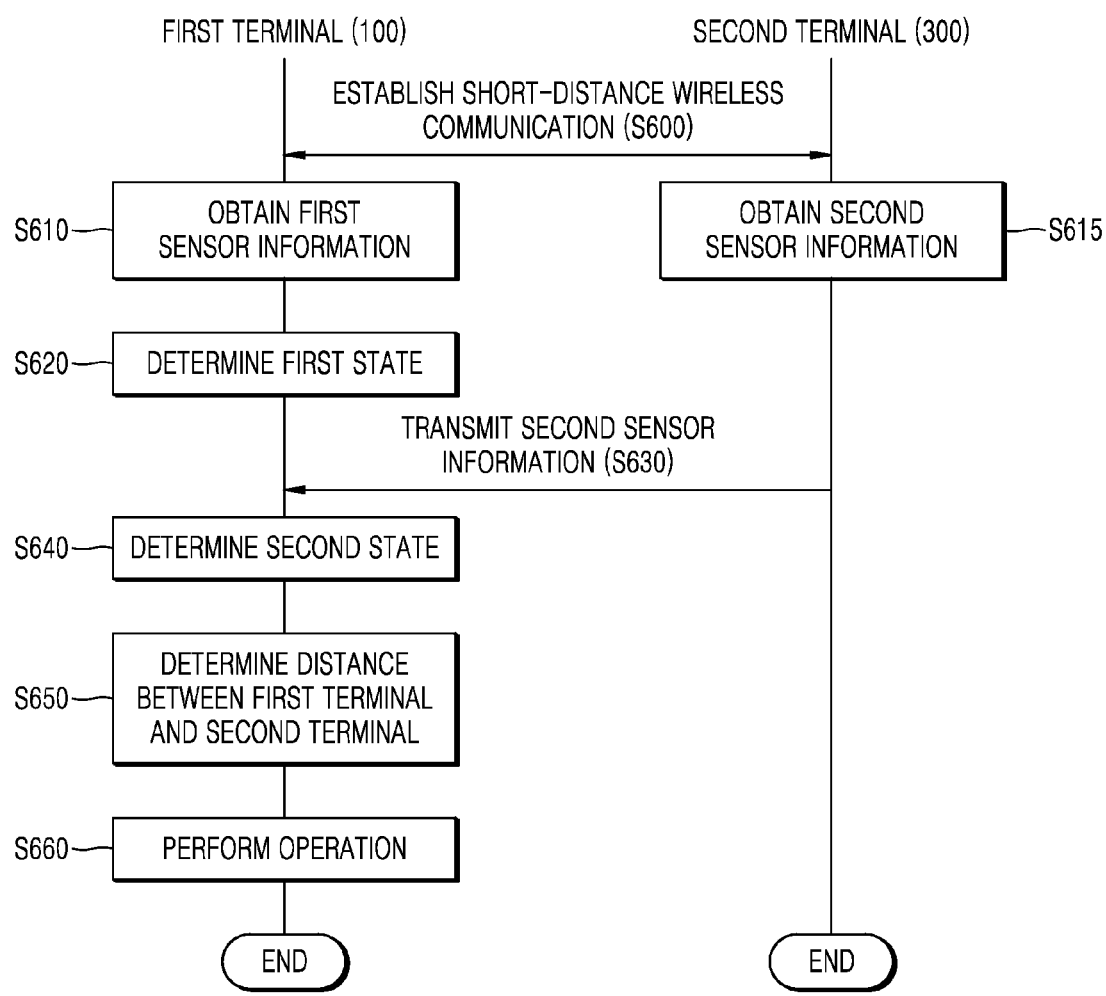
FIG. 6 is a timing diagram showing operations of the first terminal and the second terminal according to an exemplary embodiment.

FIG. 6 is a timing diagram showing operations of the first terminal 100 and the second terminal 300 according to an exemplary embodiment.

First, the first terminal 100 and the second terminal 300 may establish a short-distance wireless communication therebetween (operation S600). The short-distance wireless communication refers to a communication method of transmitting or receiving data within a designated distance. For example, the short-distance wireless communication may include Bluetooth™, infrared data association (IrDA), near field communication (NFC), or ZigBee.

The first terminal 100 may obtain first sensor information by using the sensor 110 (operation S610). The second terminal 300 may obtain second sensor information by using the sensor 310 (operation S615). The first terminal 100 may determine a first state based on the obtained first sensor information (operation S620).

The second terminal 300 may transmit the second sensor information obtained in the operation S615 to the first terminal 100 (operation S630). The second terminal 300 may transmit obtained second sensor information to the first terminal 100 as the second sensor information is obtained in real-time in the operation S615. Alternatively, the second terminal 300 may compress accumulated second sensor information and transmit the compressed second sensor information to the first terminal 100 cyclically.

The first terminal 100 may determine a second state based on the second sensor information received from the second terminal 300 (operation S640).

The first terminal 100 may determine a distance between the first terminal 100 and the second terminal 300 (operation S650)

Next, the first terminal 100 may perform an operation determined based on at least one of the distance between the first terminal 100 and the second terminal 300, information regarding the first state, and information regarding the second state (operation S660).

Figure 7:
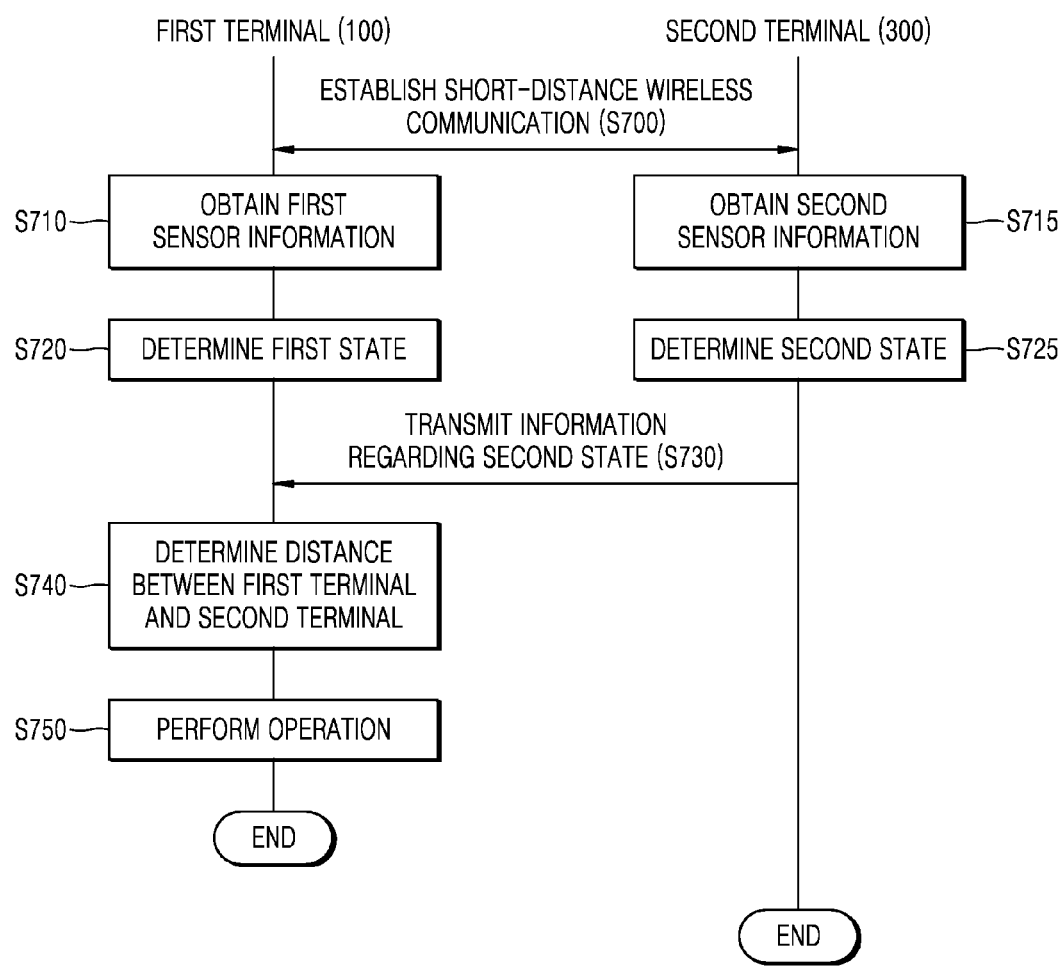
FIG. 7 is a timing diagram showing operations of the first terminal and the second terminal, according to another exemplary embodiment.

FIG. 7 is a timing diagram showing operations of the first terminal 100 and the second terminal 300 according to another exemplary embodiment.

First, the first terminal 100 and the second terminal 300 may establish a short-distance wireless communication therebetween (operation S700).

The first terminal 100 may obtain first sensor information by using the sensor 110 (operation S710). The second terminal 300 may obtain second sensor information by using the sensor 310 (operation S715). The first terminal 100 may determine a first state based on the obtained first sensor information (operation S720). The second terminal 300 may determine a second state based on the obtained second sensor information (operation S725).

Next, the second terminal 300 may transmit information regarding the second state determined in the operation S725 to the first terminal 100 (operation S730). The second terminal 300 may periodically determine the second state and periodically transmit information regarding the determined second state to the first terminal 100. According to another exemplary embodiment, in the operation S730, the second terminal 300 may transmit information regarding the second state and the second sensor information to the first terminal 100 together. The first terminal 100 may update the second state based on the information regarding the second state and the second sensor information received from the second terminal 300.

The first terminal 100 may determine a distance between the first terminal 100 and the second terminal 300 (operation S740). The first terminal 100 may determine the distance between the first terminal 100 and the second terminal 300 by using various methods according to various exemplary embodiments. For example, the first terminal 100 may determine the distance between the first terminal 100 and the second terminal 300 based on an RSSI of a wireless frequency signal used for a short-distance wireless communication with the second terminal 300. However, one or more exemplary embodiments are not limited thereto. The first terminal 100 may perform an operation determined based on at least one of the distance between the first terminal 100 and the second terminal 300, information regarding the first state, and information regarding the second state (operation S750).

Figure 8:
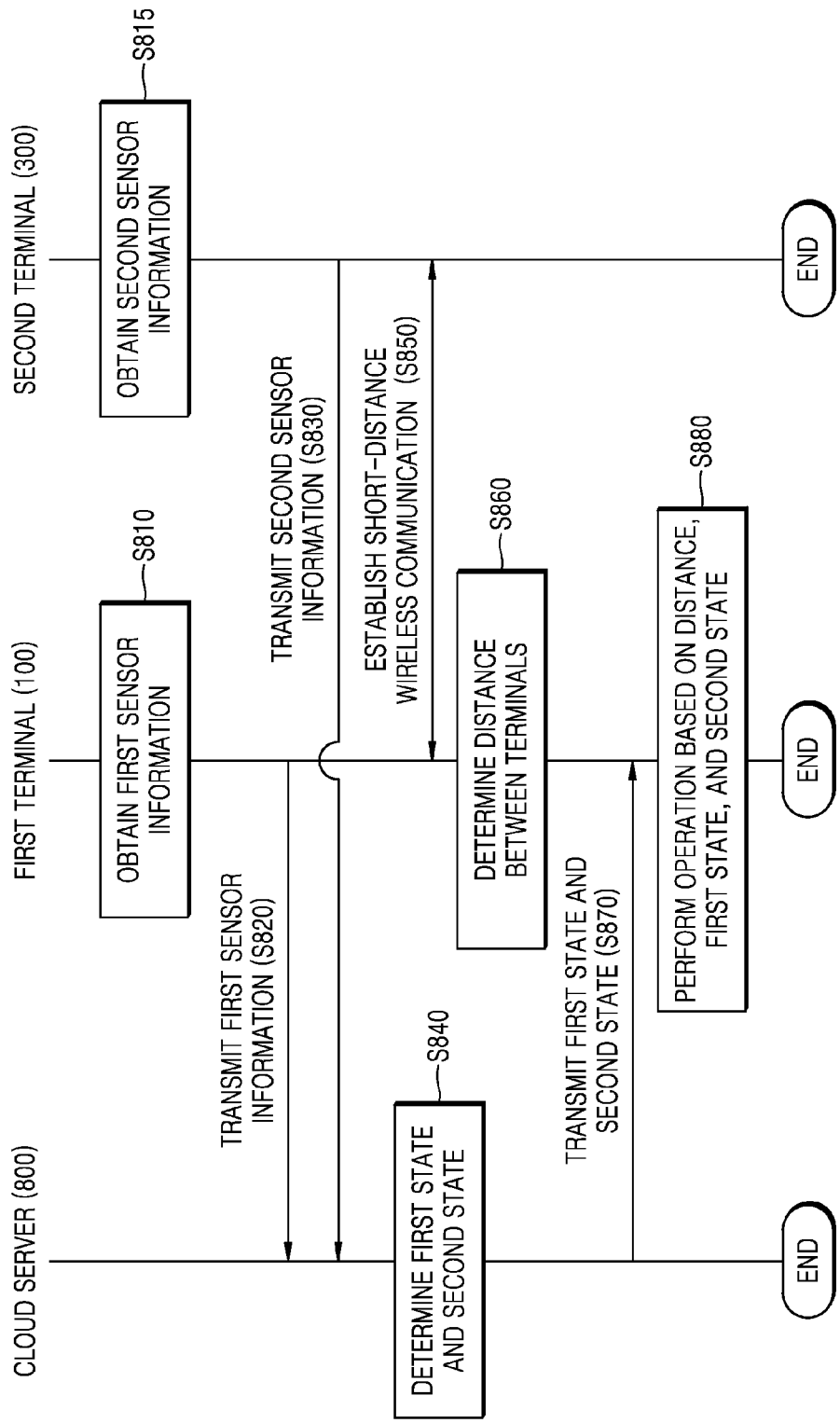
FIG. 8 is a timing diagram showing operations of the first terminal and the second terminal, according to another exemplary embodiment.

FIG. 8 is a timing diagram showing operations of the first terminal 100 and the second terminal 300 according to another exemplary embodiment.

The first terminal 100 may obtain first sensor information by using the sensor 110 (operation S810). Similarly, the second terminal 300 may obtain second sensor information by using the sensor 310 (operation S815).

The first terminal 100 may transmit the obtained first sensor information to a cloud server 800 (S820), and the second terminal 300 may transmit the obtained second sensor information to the cloud server 800 (S830). The cloud server 800 may determine a first state and a second state based on the sensor information received from the first terminal 100 and the second terminal 300 (operation S840).

Furthermore, when a short-distance wireless communication is established between the first terminal 100 and the second terminal 300 (operation S850), the first terminal 100 may determine a distance between the first terminal 100 and the second terminal 300 (operation S860). Furthermore, the first terminal 100 may receive the first state and the second state from the cloud server 800 (operation S870).

Next, the first terminal 100 may perform an operation determined based on at least one of the distance determined in the operation S860 and the first state and the second state received in the operation S870 (operation S880).

Figure 9:
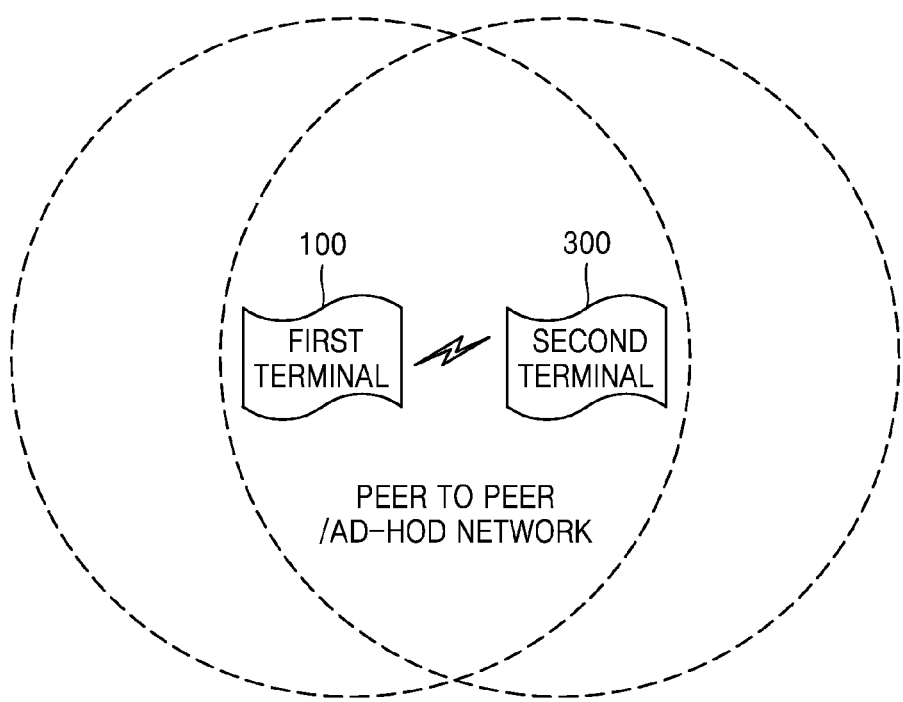
FIG. 9 is a diagram for describing a method by which the first terminal and the second terminal communicate with each other, according to an exemplary embodiment.

The first terminal 100 and the second terminal 300 may establish a communication using various methods according to various exemplary embodiments. For example, as shown in FIG. 9, the first terminal 100 and the second terminal 300 may transmit and receive data to and from each other via a direct communication without an access point (AP). For example, the first terminal 100 and the second terminal 300 may transmit and receive data to and from each other via communication methods including an Ad-hoc method from among Wi-Fi communication methods, Bluetooth™, or ZigBee.

Figure 10:
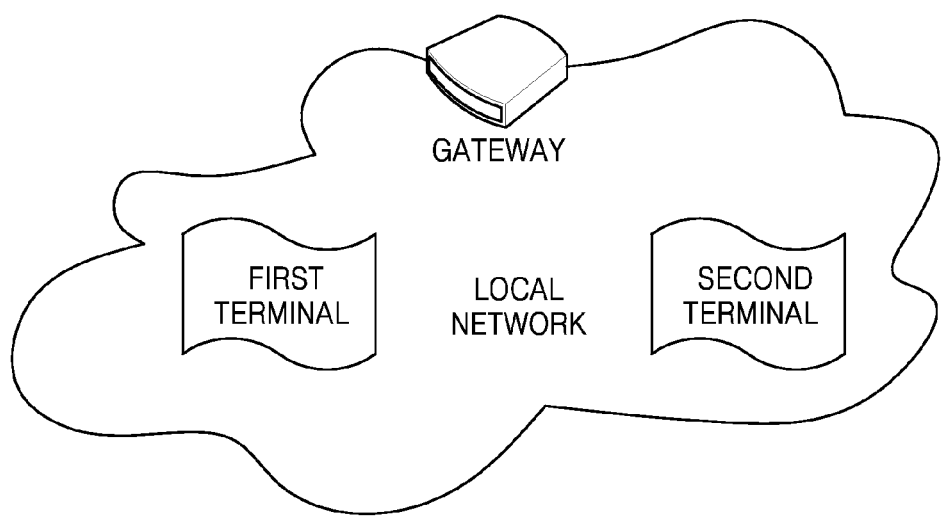
FIG. 10 is a diagram for describing a method by which the first terminal and the second terminal communicate with each other, according to another exemplary embodiment.

Furthermore, as shown in FIG. 10, the first terminal 100 and the second terminal 300 may transmit and receive data to and from each other via a gateway 1000. For example, the first terminal 100 and the second terminal 300 may transmit and receive data to and from each other via infrastructure method from among Wi-Fi communication methods, a home network formed by using a gateway, or a local area network (LAN). The gateway 1000 may function as an AP.

Figure 11:
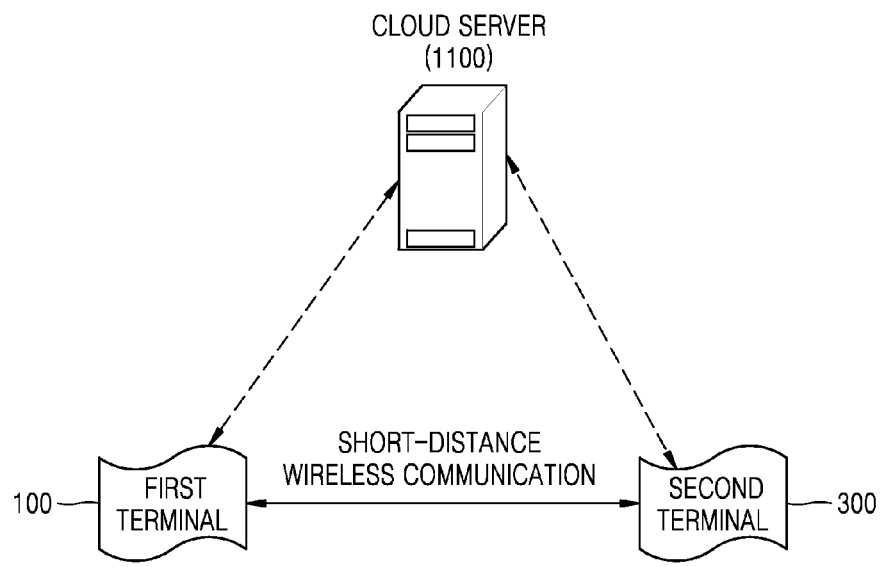
FIG. 11 is a diagram for describing a method by which the first terminal and the second terminal communicate with each other, according to another embodiment.

Furthermore, as shown in FIG. 11, the first terminal 100 and the second terminal 300 may communicate with a cloud server 1100 via a wired or wireless connection. The first terminal 100 and the second terminal 300 may transmit sensor information to the cloud server 1100 and receive information regarding a first state and a second state determined based on the sensor information from the cloud server 1100.

Figure 12:
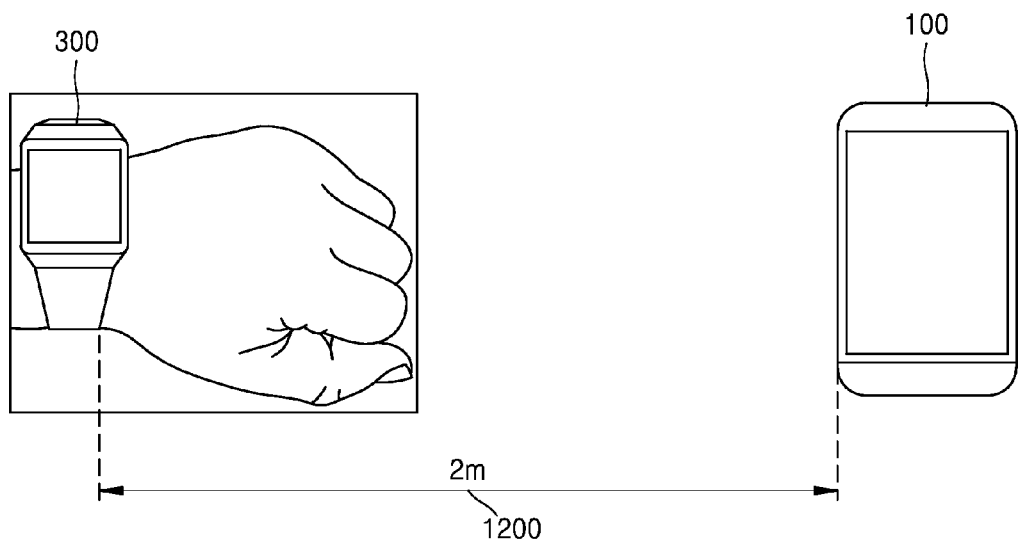
FIGS. 12 through 14 are diagrams for describing operations of the first terminal and the second terminal, according to an exemplary embodiment.
Figure 13:
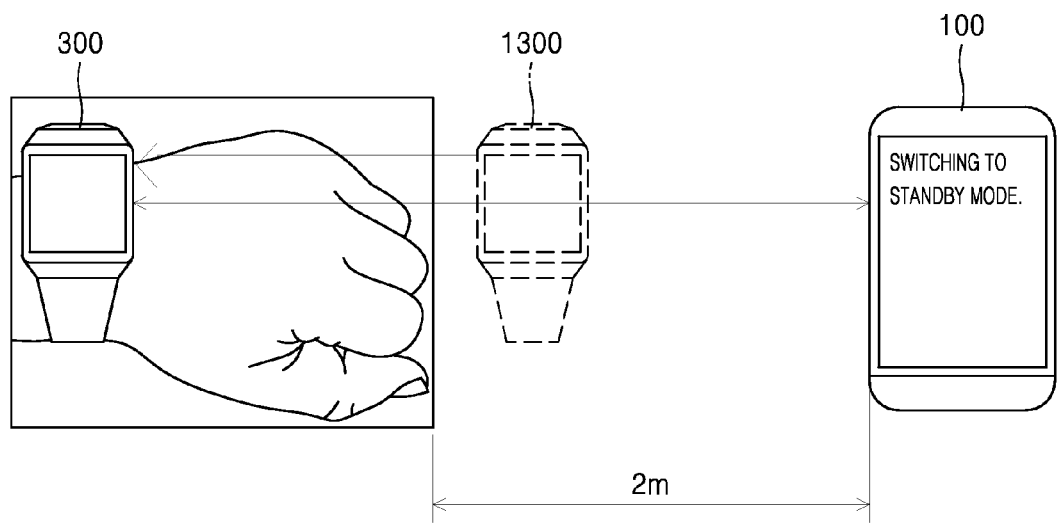
Figure 14:
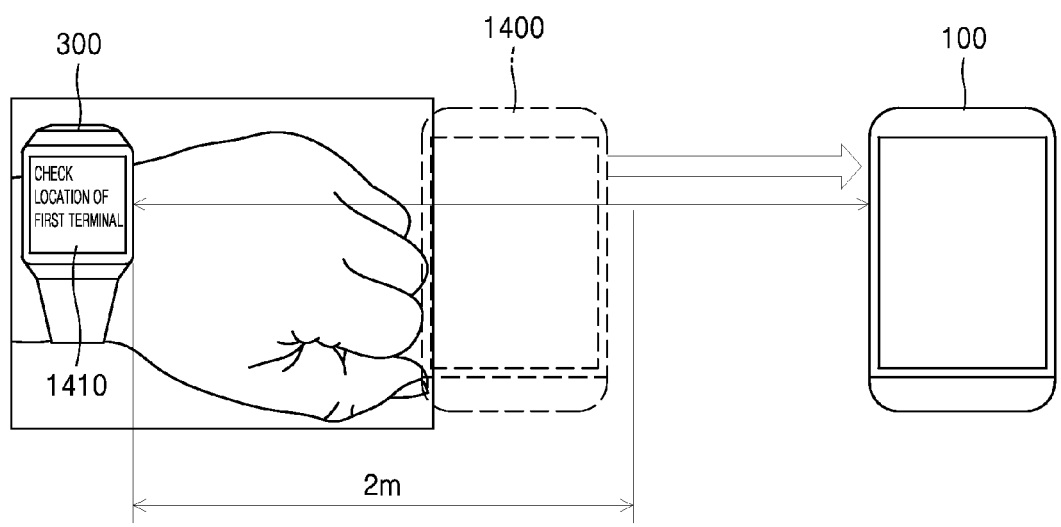

FIGS. 12 through 14 are diagrams for describing operations of the first terminal 100 and the second terminal 300 according to an exemplary embodiment.

As shown in FIG. 12, the first terminal 100 may be a smart phone that may be carried by a user, and the second terminal 300 may be a wearable device that may be worn by the user. As shown in FIG. 12, in the case where a critical value of a distance 1200 between the first terminal 100 and the second terminal 300 is 2 m, the first terminal 100 or the second terminal 300 may determine whether to perform an operation based on a first state, a second state, and the distance 1200 when the distance 1200 is 2 m.

When a short-distance wireless communication is established between a smart phone and a wearable device, if a user moves without carrying the smart phone, a distance between the smart phone and the wearable device increases. In this case, the user is likely not using the smart phone. Therefore, as shown in FIG. 13, if a distance between the first terminal 100 and the second terminal 300 is greater than a critical value (e.g., 2 m), the smart phone, which is the first terminal 100, is not moving, and the wearable device, which is the second terminal 300, is moved from an original location 1300, the first terminal 100 may switch to a standby mode to reduce power consumption. In this case, a first state indicating a state of the first terminal 100 may indicate that no motion is detected. Furthermore, a second state indicating a state of the second terminal 300 may indicate that a motion is detected. The standby mode may refer to a mode in which a display, a sensor, and a communicator are deactivated.

Furthermore, since a wearable device is worn on a body part of a user, a state in which the wearable device is not moving may refer to a state in which the user is not moving. Therefore, a state in which a smart phone moves while a wearable device is not moving may refer to a state that the smart phone is being moved by a person other than the user.

If the first state indicates that a motion is detected and the second state indicates that no motion is detected, the first and second states may indicate that the first terminal 100 is moved from an original location 1400, as shown in FIG. 14. Therefore, when a distance between the first terminal 100 and the second terminal 300 is greater than a critical value (e.g., 2 m), if the first state indicates that a motion is detected and the second state indicates that no motion is detected, an anti-theft alarm message 1410 may be output to the second terminal 300. The anti-theft alarm message 1410 may be a message transmitted by the first terminal 100 or a message generated by the second terminal 300.

Related to the exemplary embodiments shown in FIGS. 12 through 14, FIG. 15A is a diagram for describing an operation determined based on a first state and a second state. When a distance between the first terminal 100 and the second terminal 300 is greater than a critical value, the first terminal 100 and the second terminal 300 may operate as shown in FIG. 15A.

The first state may indicate that a motion of the first terminal 100 is detected, whereas the first state may indicate that a motion of the second terminal 300 is detected. In this case, an alarm message may be displayed at least one of the two terminals (the first terminal 100 and the second terminal 300). Furthermore, if states of the first terminal 100 and the second terminal 300 are identical to those shown in FIG. 13, the first state may indicate that no motion of the first terminal 100 is detected and the second state may indicate that a motion of the second terminal 300 is detected. In this case, the first terminal 100 may switch an operation mode of the first terminal 100 to a standby mode. Furthermore, if states of the first terminal 100 and the second terminal 300 are identical to those shown in FIG. 14, the first state may indicate that a motion of the first terminal 100 is detected and the second state may indicate that no motion of the second terminal 300 is detected. In this case, an alarm message may be displayed at the second terminal 300. If both the first state and the second state indicate no motion is detected, the change of a distance between the first terminal 100 and the second terminal 300 without motions of the first terminal 100 and the second terminal 300 may indicate that at least one of the first state, the second state, and the distance between the first terminal 100 and the second terminal 300 is erroneous. Therefore, in this case, the first terminal 100 or the second terminal 300 may determine at least one of the first state, the second state, and the distance between the first terminal 100 and the second terminal 300 again.

FIG. 15B is a diagram for describing an operation determined based on a first state and a second state. If a distance between the first terminal 100 and the second terminal 300 is greater than a critical value, the first terminal 100 and the second terminal 300 may operate as shown in FIG. 15B.

If the first terminal 100 is stolen by another person, the distance between the first terminal 100 and the second terminal 300 may be greater than the critical value, a motion of the first terminal 100 may be detected, and no motion of the second terminal 300 may be detected. Therefore, in this case, the first terminal 100 may be configured to transmit a loss/theft notification message to the second terminal 300. The second terminal 300, which received the loss/theft notification message, may display the received loss/theft notification message. Furthermore, the first terminal 100 may execute a data protection mode for protecting data stored therein.

When a user moves and the first terminal 100 was left behind, the distance between the first terminal 100 and the second terminal 300 may be greater than the critical value, no motion of the first terminal 100 may be detected, and a motion of the second terminal 300 may be detected. Therefore, in this case, the first terminal 100 may be configured to transmit a standby mode notification message indicating that the first terminal 100 is in the standby mode to the second terminal 300. The second terminal 300, which received the standby mode notification message, may display the received standby mode notification message. Furthermore, the first terminal 100 may set up the standby mode for reducing power consumption.

Furthermore, if the first terminal 100 is stolen, the distance between the first terminal 100 and the second terminal 300 may be greater than the critical value, a motion of the first terminal 100 may be detected, and a motion of the second terminal 300 may also be detected. Therefore, in this case, the first terminal 100 may be configured to transmit a loss/theft notification message to the second terminal 300. The second terminal 300, which received the loss/theft notification message, may display the received loss/theft notification message. Furthermore, the first terminal 100 may execute a data protection mode for protecting data stored therein.

If the distance between the first terminal 100 and the second terminal 300 is greater than the critical value, no motion of the first terminal 100 is detected, and no motion of the second terminal 300 is detected, at least one of the first state, the second state, and the distance between the first terminal 100 and the second terminal 300 is erroneous. Therefore, in this case, the first terminal 100 or the second terminal 300 may determine at least one of the first state, the second state, and the distance between the first terminal 100 and the second terminal 300 again.

FIG. 16 is a flowchart for describing a process in which the first terminal 100 performs an operation based on a first state and a second state, according to an exemplary embodiment.

The first terminal 100 may determine the first state indicating a state of the first terminal 100 (operation S1610) and determine the second state indicating a state of the second terminal 300 (operation S1620). The first state may include information regarding a motion of the first terminal 100. Furthermore, the second state may include information regarding a motion of the second terminal 300. Information regarding a motion of a terminal may include information regarding a direction, a speed, and a pattern of the motion of the terminal.

Next, the first terminal 100 may determine whether a distance between the first terminal 100 and the second terminal 300 is greater than or equal to a critical value (operation S1630). If the distance between the first terminal 100 and the second terminal 300 is less than the critical value, the first terminal 100 may update the first state and the second state again (operations S1610 and S1620). If the distance between the first terminal 100 and the second terminal 300 is less than the critical value, the first state and the second state may be periodically updated.

If the distance between the first terminal 100 and the second terminal 300 is greater than or equal to the critical value (operation S1630), the first terminal 100 may determine whether the first terminal 100 is moving based on the first state (operation S1640).

In a state that a motion of the first terminal 100 is being detected, the first terminal 100 may determine whether the second terminal 300 is moving based on the second state (operation S1650). If the second state indicates that a motion of the second terminal 300 is being detected, the first terminal 100 may display an alarm message (operation S1660). Furthermore, the first terminal 100 may transmit the alarm message to the second terminal 300 (operation S1665). However, if the second state indicates that no motion of the second terminal 300 is detected, the first terminal 100 may only transmit an alarm message to the second terminal 300 (operation S1670).

In a state that no motion of the first terminal 100 is being detected, the first terminal 100 may determine whether the second terminal 300 is moving based on the second state (operation S1655). If the second state indicates that a motion of the second terminal 300 is being detected, the first terminal 100 may switch an operation mode of the first terminal 100 to a standby mode (operation S1680). However, if the second state indicates that no motion of the second terminal 300 is detected, the first terminal 100 may perform the process from the operation S1610.

According to an exemplary embodiment, detection of a motion of the first terminal 100 or the second terminal 300 in the operations S1640, S1650, and S1655 may mean that a designated motion of a user possessing the first terminal 100 or the second terminal 300 is detected. For example, if information regarding a direction, a speed, and a pattern of a motion of the first terminal 100 included in the first state (determined based on the first sensor information) is similar to a direction, a speed, and a pattern corresponding to the case in which a user possessing the first terminal 100 is walking, the first terminal 100 may determine that a motion of the first terminal 100 is detected in the operation S1640. In the same regard, in the operations S1650 and S1655, if information included in the second state indicates a designated motion of a user possessing the second terminal 300, the first terminal 100 may determine that a motion of the second terminal 300 is detected.

Figure 17:
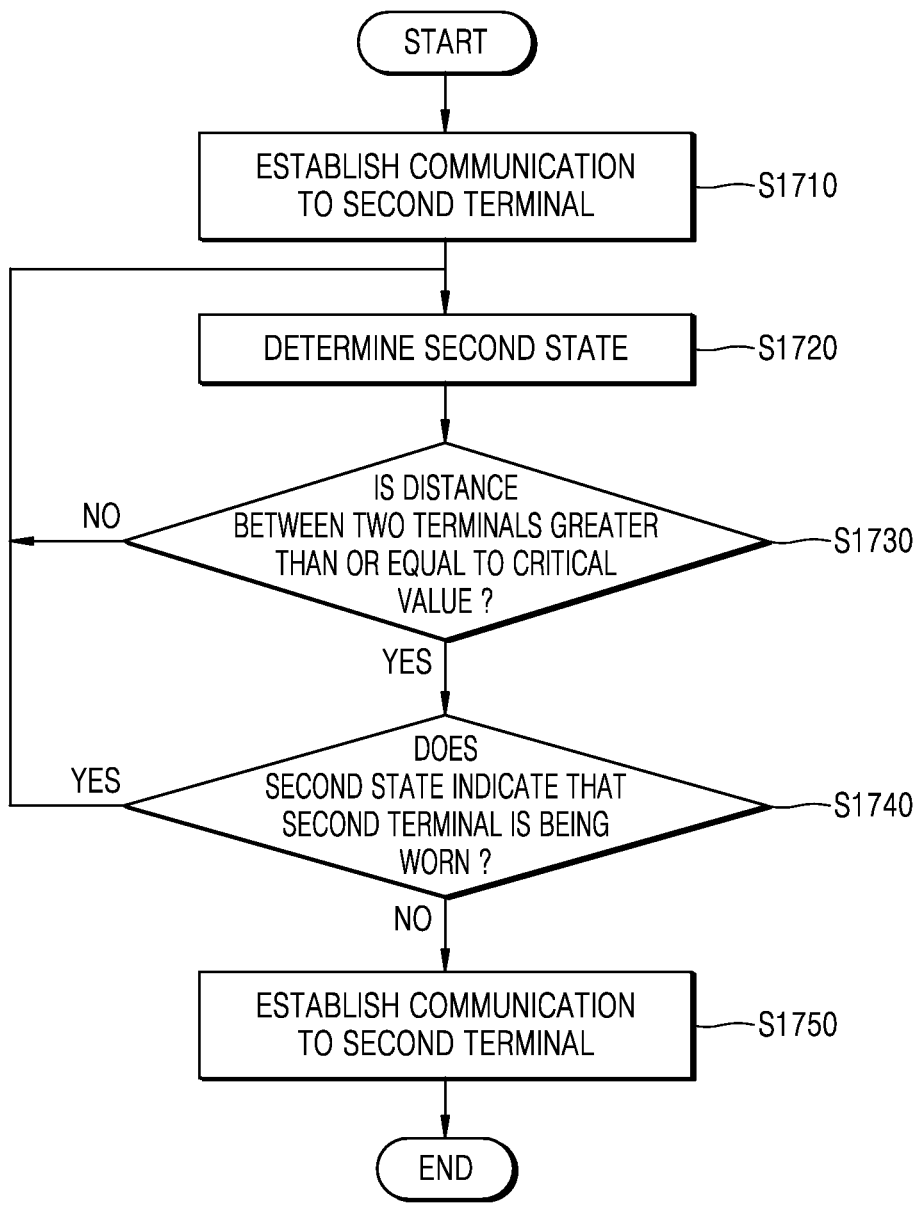
FIG. 17 is a flowchart for describing a process in which a first terminal performs an operation, according to another exemplary embodiment.

FIG. 17 is a flowchart for describing a process in which the first terminal 100 performs an operation based on a wearing state of the second terminal 300, according to another exemplary embodiment.

First, the first terminal 100 may establish a communication with the second terminal 300 (operation S1710). Next, the first terminal 100 may determine a second state based on second sensor information or information regarding the second state received from the second terminal 300 (operation S1720).

Next, the first terminal 100 may determine whether a distance between the first terminal 100 and the second terminal 300 is greater than or equal to a critical value (operation S1730). According to an exemplary embodiment, the first terminal 100 may determine whether the distance between the first terminal 100 and the second terminal 300 greater than the critical value is maintained for a set period of time. If the distance between the first terminal 100 and the second terminal 300 is less than the critical value, the first terminal 100 may update the second state by re-performing the operation S1720. If the distance between the first terminal 100 and the second terminal 300 is neither equal to nor greater than the critical value, the first terminal 100 may periodically update the second state by re-performing the operation S1720 after a designated time period elapses.

If the distance between the first terminal 100 and the second terminal 300 is greater than or equal to the critical value, the first terminal 100 may determine whether the second state indicates that the user is wearing the second terminal 300, based on the second state. If the second state indicates that the user is wearing the second terminal 300, the first terminal 100 may update the second state by re-performing the operation S1720. The first terminal 100 may periodically update the second state by re-performing the operation S1720 after a designated time period has elapsed. Alternatively, if the second state indicates that the user is not wearing the second terminal 300, the first terminal 100 may terminate a communication to the second terminal 300 (operation S1750).

Figure 18:
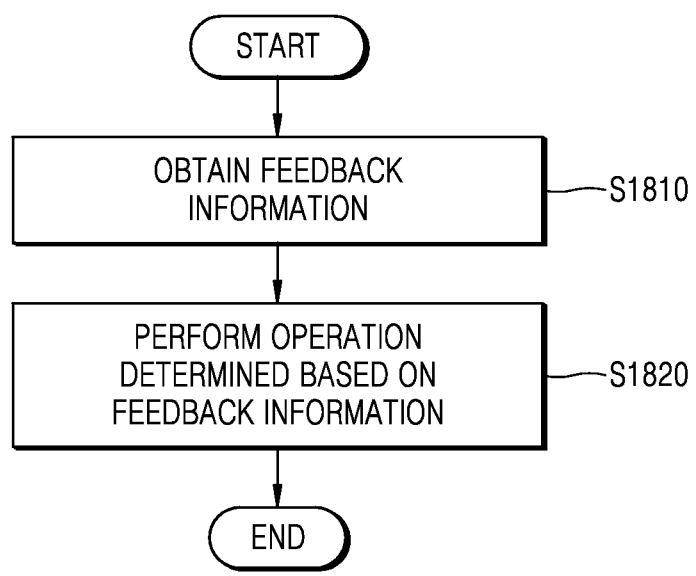
FIG. 18 is a flowchart for describing a process of performing an operation determined based on feedback information regarding an operation performed by a first terminal, according to an exemplary embodiment.

FIG. 18 is a flowchart for describing a process of performing an operation determined based on feedback information regarding an operation performed by the first terminal 100, according to an exemplary embodiment.

The first terminal 100 may receive feedback information regarding the operation performed by the first terminal 100 in the operation S530 of FIG. 5 (operation S1810). The first terminal 100 may receive feedback information in various ways according to various exemplary embodiments. The first terminal 100 may receive feedback information by using at least one method including receiving a direct response from a user, receiving an indirect response from a user, and recognizing a surrounding environment.

The method of receiving a direct response from a user may include a method of receiving an input for selecting at least one of a plurality of menus included in a user interface from the user. Alternatively, the first terminal 100 may receive a voice command of a user via the microphone 162. Furthermore, the first terminal 100 may receive a gesture command of a user as a feedback input via an acceleration sensor, a gyro sensor, or the camera 150.

The method of receiving an indirect response from a user may include a method of obtaining feedback information based on biometric signals by using a sensor included in the first terminal 100. For example, after the first terminal 100 or the second terminal 300 outputs an alarm message, biometric signals including at least one of a heart rate, a blood pressure, a muscle movement, and a brain wave may be obtained by using at least one of a heart rate sensor, a blood pressure sensor, a muscle sensor, and a brain wave sensor.

In the method of recognizing a surrounding environment, as non-limiting examples, ambient noises may be recognized by using the microphone 162, ambient luminance may be recognized by using a luminance sensor of the sensor 110, or information regarding a location of the first terminal 100 may be obtained by using the GPS device 140.

Next, the first terminal 100 may perform an operation determined based on obtained feedback information (operation S1820). If the first terminal 100 or the second terminal 300 outputted an alarm message in the operation S530, the operation determined based on the feedback information according to an exemplary embodiment may be an operation for outputting an additional alarm message to the first terminal 100 or the second terminal 300. In this case, the first terminal 100 may output an additional alarm message based on the feedback information obtained in the operation S1810.

For example, if a biometric signal obtained in the operation S1810 changes, the first terminal 100 may determine that the user is nervous and may reduce the intensity of a vibration or volume of a sound for outputting an additional alarm message. In another example, if an alarm message is output to the second terminal 300, an additional alarm message may be output to a terminal other than the second terminal 300 based on a menu selecting input or voice of a user received in the operation S1810. In other words, if an alarm message is output to a wearable device, an alarm message may be output using a speaker or a display arranged in a vehicle. For example, even if the second terminal 300 outputs an alarm message regarding loss of the first terminal 100 as a user loses the first terminal 100, the user may not check the alarm message. Next, if the user enters into a vehicle, a short-distance wireless communication may be established between the second terminal 300 and the vehicle, and an alarm message regarding the loss may be additionally output via a speaker of the vehicle. However, one or more exemplary embodiments are not limited thereto.

Furthermore, the first terminal 100 may change a period for outputting additional alarm messages based on feedback information. Furthermore, the first terminal 100 may change a form or a content of an additional alarm message. For example, if an alarm message is a theft notification message, the additional alarm message may be a message indicating information regarding a location of the first terminal 100 or the second terminal 300. In another example, feedback information may include information regarding ambient noises. If levels of the ambient noises are high, the volume of an alarm message may be increased (in the case of outputting the alarm message as a sound), the intensity of a vibration may be increased (in the case of outputting the alarm message as a vibration), or the alarm message may be output a plurality of number of times at short intervals. However, one or more exemplary embodiments are not limited thereto.

Figure 19:
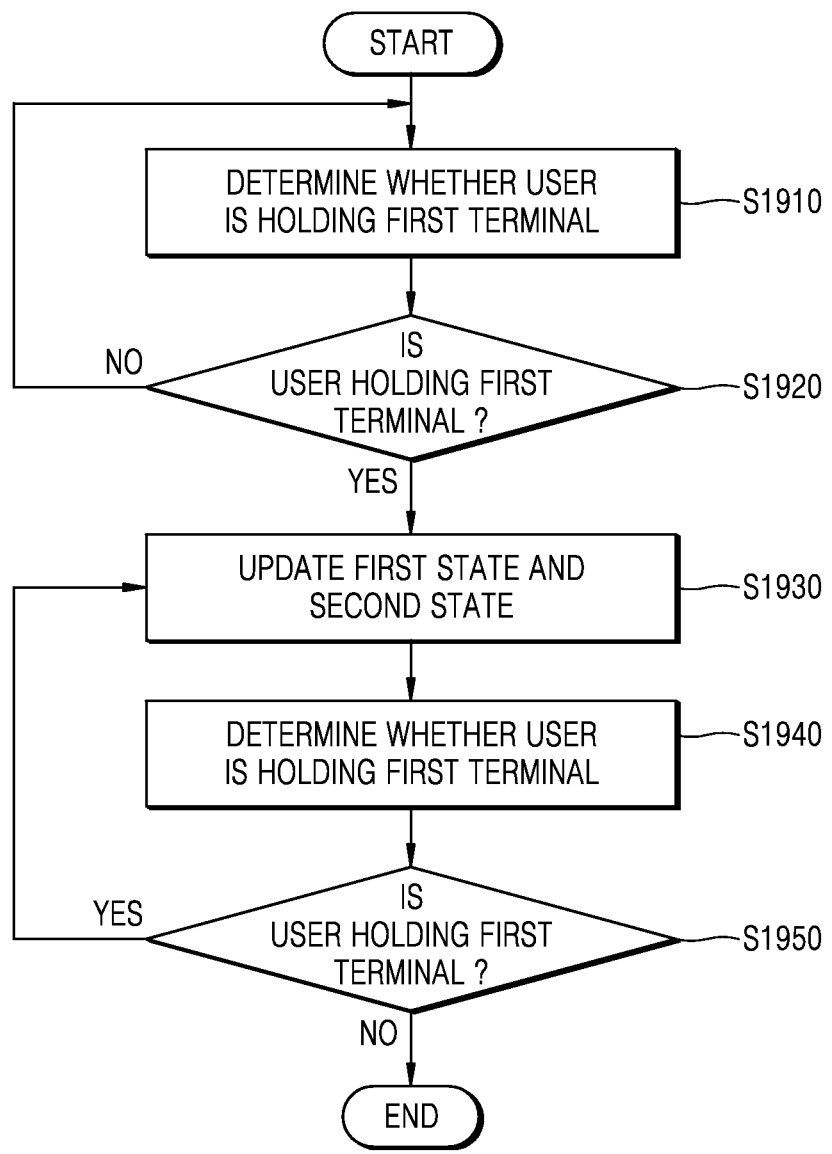
FIG. 19 is a flowchart showing a process in which a first terminal performs an advanced synchronization, according to an exemplary embodiment.

FIG. 19 is a flowchart showing a process in which the first terminal 100 performs an advanced synchronization according to an exemplary embodiment.

Figure 20:
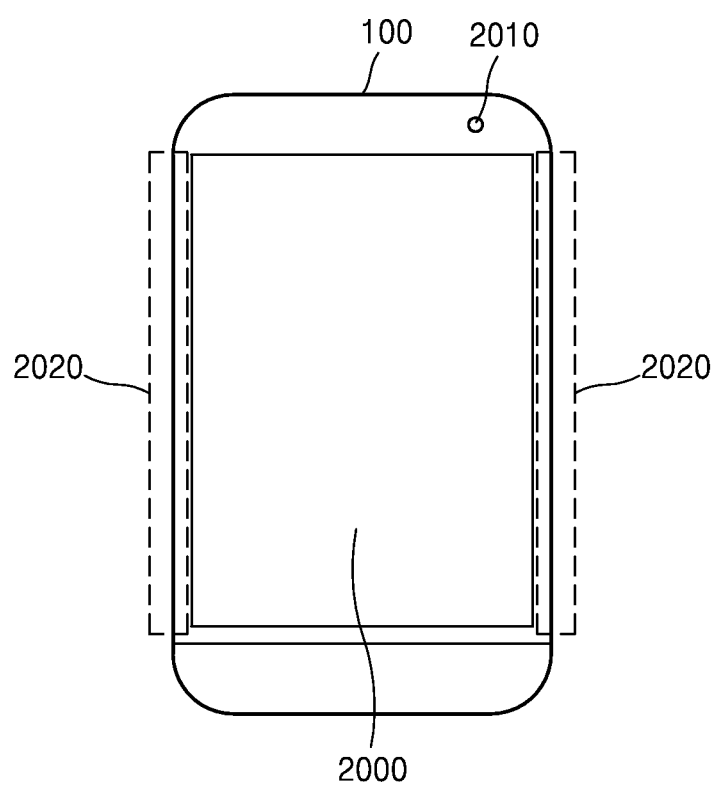
FIG. 20 is a schematic diagram showing the first terminal performing an advanced synchronization, according to an exemplary embodiment.

First, the first terminal 100 may determine whether a user is holding the first terminal 100 (operation S1910). Various methods may be used to determine whether the user is holding the first terminal 100, according to various exemplary embodiments. FIG. 20 is a schematic diagram showing the first terminal 100 performing an advanced synchronization according to the exemplary embodiment shown in FIG. 19. Referring to FIG. 20, the first terminal 100 may include a camera 2010 arranged on a same surface as a display 2000. If the user holds the first terminal 100, such that the display 2000 faces toward the face of the user, the first terminal 100 may photograph the face of the user by using the camera 2010. If an image captured by the camera 2010 includes the face of the user, the first terminal 100 may determine that the user is holding the first terminal 100. The first terminal 100 may perform image recognition with respect to the captured image. Alternatively, the first terminal 100 may include a touch sensor 2020. If the user contacts the touch sensor 2020 by holding the first terminal 100, the first terminal 100 may receive a touch input via the touch sensor 2020. The first terminal 100 may determine whether the user is holding the first terminal 100 based on a received touch input.

If the user is determined to be holding the first terminal 100 (operation S1920-Y), the first terminal 100 may update a first state and a second state (operation S1930). The first terminal 100 may receive second sensor information from the second terminal 300 as shown in FIG. 6, receive information regarding the second state from the second terminal 300 as shown in FIG. 7, or receive information regarding the first state and the second state from the cloud server 800 as shown in FIG. 8. However, one or more exemplary embodiments are not limited thereto.

The user may continue to update the first state and the second state while the user is determined to be holding the first terminal 100 (S1930-S1950).

Figure 21:
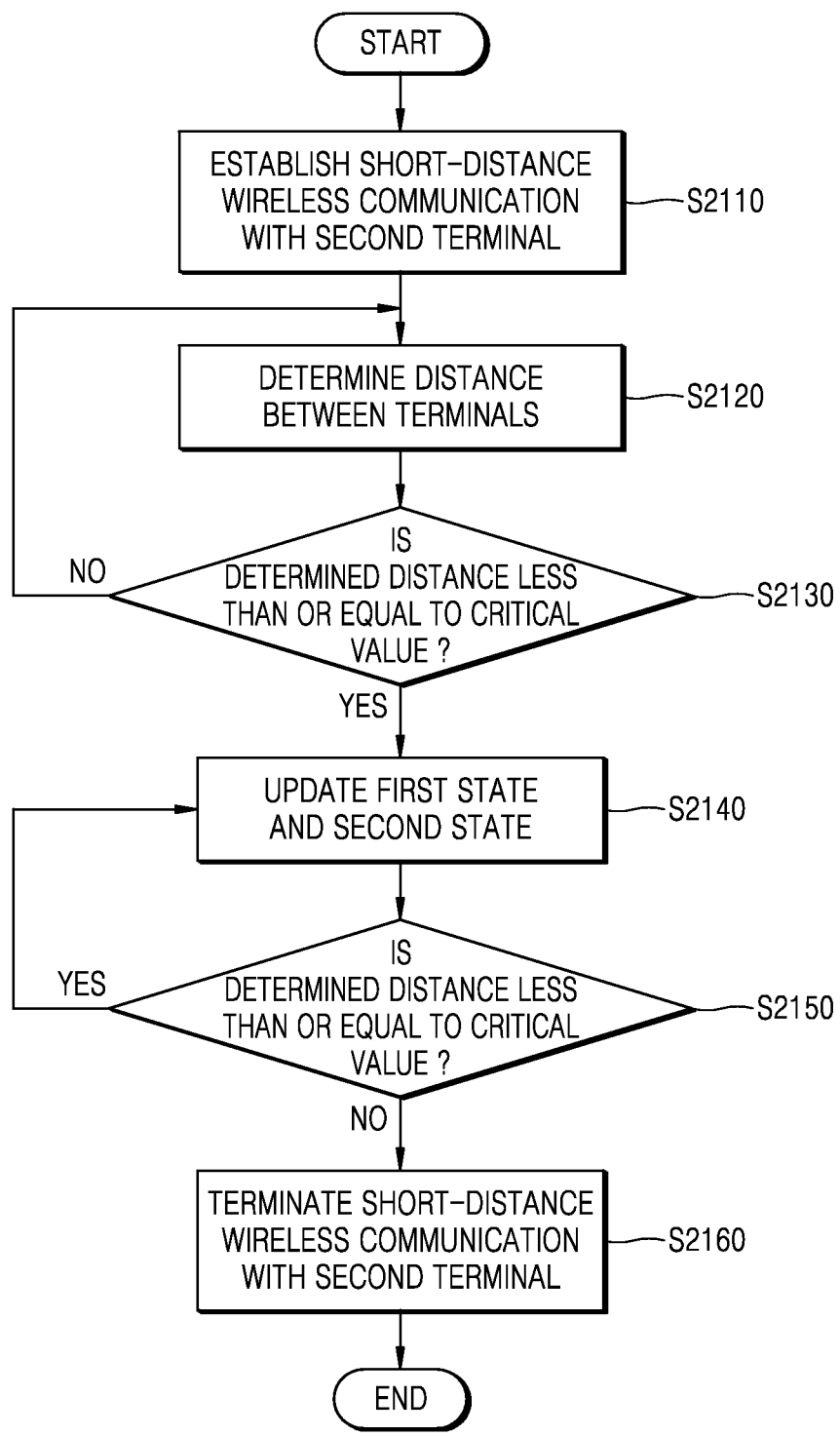
FIG. 21 is a flowchart showing a process of performing an advanced synchronization, according to another exemplary embodiment.

FIG. 21 is a flowchart showing a process of performing an advanced synchronization, according to another exemplary embodiment.

First, the first terminal 100 may establish a short-distance wireless communication with the second terminal 300 (operation S2110). Next, the first terminal 100 may determine a distance between the first terminal 100 and the second terminal 300 that are connected to each other via the short-distance wireless communication (operation S2120). The distance between the first terminal 100 and the second terminal 300 may be determined by using various methods according to various exemplary embodiments. Next, if a determined distance is greater than a critical value (operation S2130-N), the first terminal 100 may monitor the distance between the first terminal 100 and the second terminal 300 by performing the operation S2120 periodically.

Figure 22:
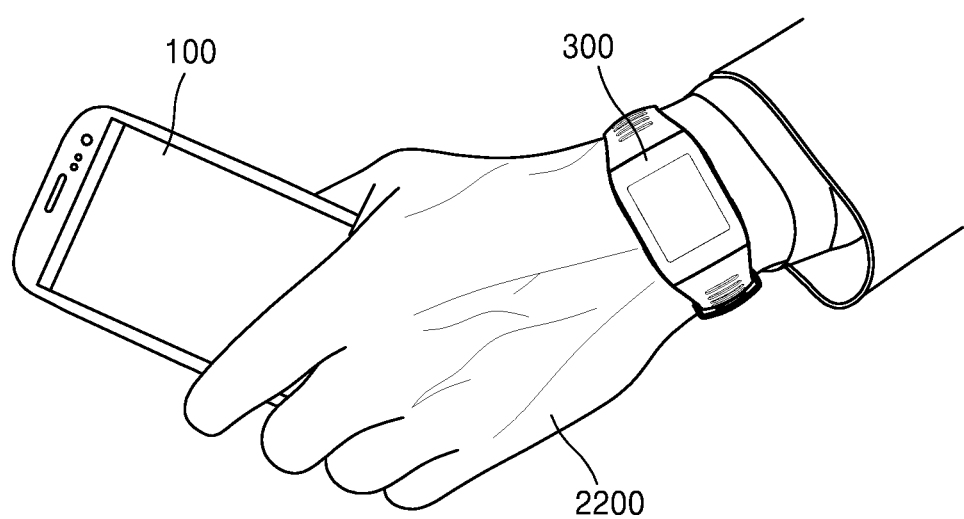
FIG. 22 is a diagram for describing the execution of an advanced synchronization according to an exemplary embodiment.

If the distance determined in the operation S2120 is less than or equal to the critical value (the operation S2130-Y), the first terminal 100 may update the first state and the second state (operation S2140). For example, referring to FIG. 22, if a user 2200 wearing the second terminal 300, which is a wearable device, approaches the first terminal 100 and holds the first terminal 100, the first terminal 100 and the second terminal 300 are near each other. In this case, the first terminal 100 may update the first state and the second state for an advanced synchronization. In an operation S2140, the first terminal 100 may update the first state and the second state via at least one of the processes shown in FIGS. 6 through 8. In other words, the first terminal 100 may obtain information regarding the first state and information regarding the second state and determine the first state and the second state based on the obtained information. After a designated time period elapses after the operation S2140, the first terminal 100 may determine a distance between the first terminal 100 and the second terminal 300 again. If the determined distance is less than or equal to the critical value (operation S2150-Y), the first terminal 100 may perform the operation S2140, thereby periodically updating the first state and the second state while the first terminal 100 and the second terminal 300 are near each other. However, if the determined distance is greater than the critical value (the operation S2150-N), the first terminal 100 may terminate the short-distance wireless communication with the second terminal 300 (operation S2160).

To prevent the short-distance wireless communication from being terminated if the user temporarily puts down the first terminal 100, the critical value of the operation S2130 may be different from the critical value of the operation S2150. In other words, the critical value of the operation S2150 may be greater than the critical value of the operation S2130. For example, in the operation S2130, the critical value may be about 50 cm to recognize a state that the user possesses both the first terminal 100 and the second terminal 300. Furthermore, in the operation S2150, the critical value may be about 10 m to maintain the short-distance wireless communication when the user wearing the second terminal 300 is near the first terminal 100.

Figure 23:
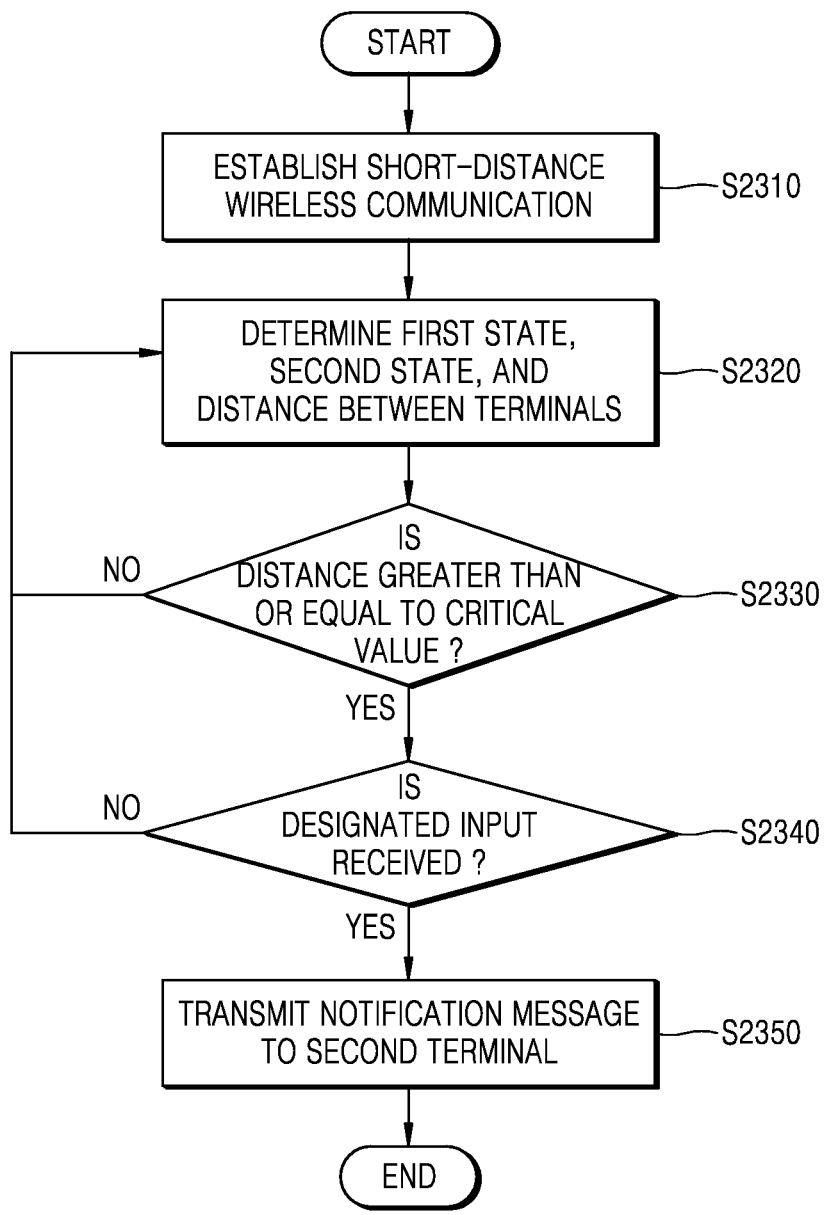
FIG. 23 is a flowchart showing a process of displaying a notification message on the second terminal, according to an exemplary embodiment.
Figure 25:
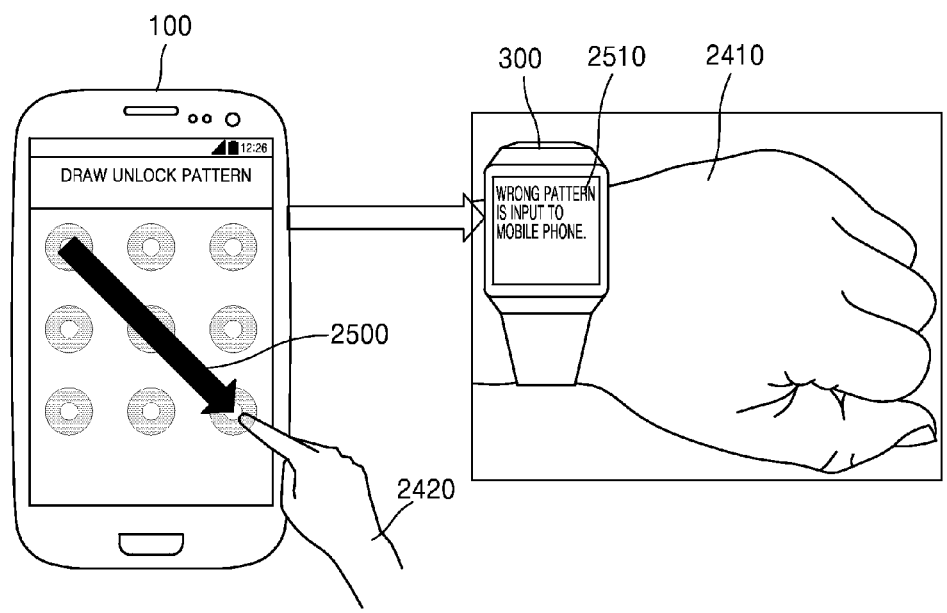
Figure 26:
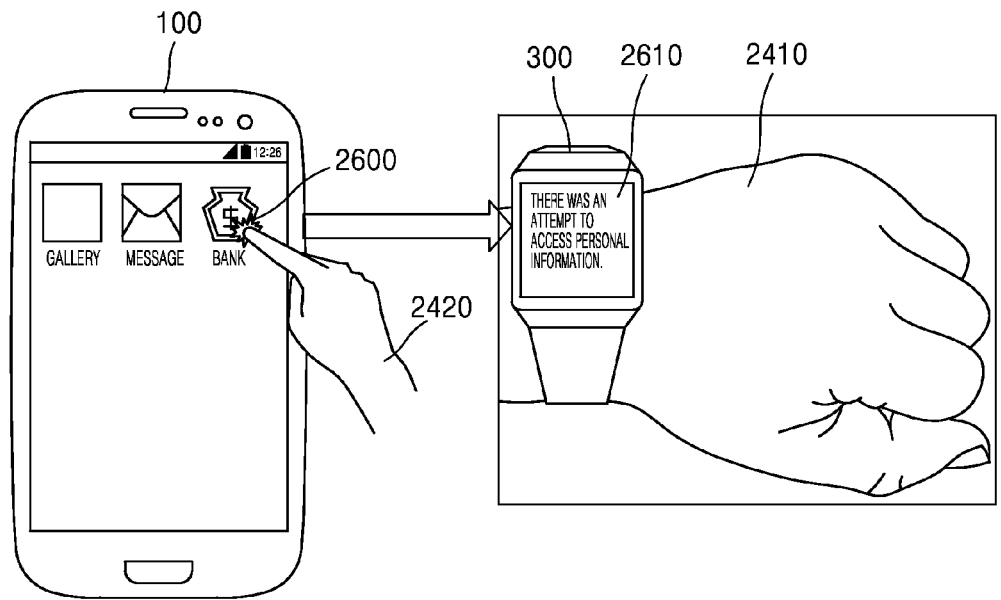

FIG. 23 is a flowchart showing a process of displaying a notification message on the second terminal 300, according to an exemplary embodiment. According to an exemplary embodiment, if the first terminal 100 is stolen by another person, a notification message may be displayed at the second terminal 300 to prevent important information of a user from being exposed to the another person from the first terminal 100. Furthermore, FIGS. 24 through 26 are diagrams for describing examples of displaying notification messages at the second terminal 300 according to the exemplary embodiment shown in FIG. 23.

Referring to FIG. 23, in an operation S2310, the first terminal 100 may establish a short-distance wireless communication with the second terminal 300. Next, based on the short-distance wireless communication established in the operation S2310, the first terminal 100 may determine a first state, a second state, and a distance between the first terminal 100 and the second terminal 300 (operation S2320).

Next, in an operation S2330, the first terminal 100 may determine whether the distance between the first terminal 100 and the second terminal 300 is greater than or equal to a critical value. The first terminal 100 may determine whether the first terminal 100 is stolen based on the first state and the second state in the operation S2330. For example, as the conditions as shown in FIG. 14 are given, the second state may indicate that a user is not moving, whereas the first state may indicate that the user is walking. In this case, if the distance between the first terminal 100 and the second terminal 300 is greater than or equal to the critical value, the first terminal 100 may determine that the first terminal 100 is stolen. If the distance between the first terminal 100 and the second terminal 300 is less than or equal to the critical value, the first terminal 100 may perform the operation S2320 again.

Figure 24:
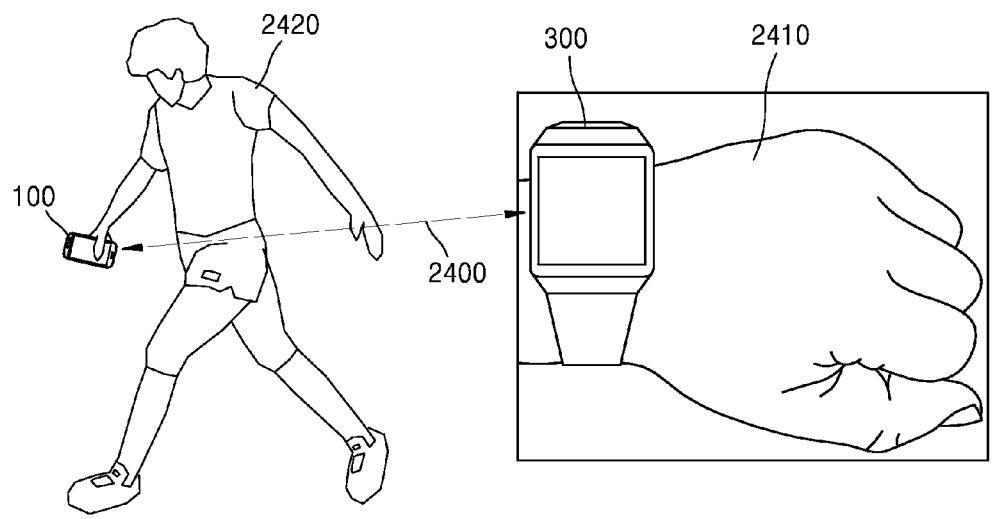
FIGS. 24 through 26 are diagrams for describing examples of displaying notification messages on the second terminal, according to various exemplary embodiments.

FIG. 24 shows an exemplary embodiment in the case where the first terminal 100 is a mobile phone and the second terminal 300 is a wearable device that may be worn on a wrist of a user 2410. If the first terminal 100 is stolen by another person 2420, a distance 2400 between the first terminal 100 and the second terminal 300 increases. Furthermore, if the another person 2420 moves while holding the first terminal 100, motions that may be obtained via the first terminal 100 may show a pattern of motions that is detected as a person moves while holding the first terminal 100. If the distance 2400 is greater than or equal to a pre-set critical value and the first state and the second state indicate that the first terminal 100 and the second terminal 300 are being moved in different directions or the first terminal 100 is being moved while the second terminal 300 is not being moved, the first terminal 100 may be stolen by the another person 2420.

In the operation S2330, if the distance 2400 is greater than or equal to the critical value (or the first terminal 100 is determined to be stolen), the first terminal 100 may determine whether an input that is designated as an input corresponding to a major function is received (operation S2340). If the designated input is received (S2340-Y), the first terminal 100 may transmit a notification message to the second terminal 300 (S2350). The notification message may include information regarding an input received by the first terminal 100. For example, if a received input is an input for retrieving picture data, the first terminal 100 may transmit a message "there was an attempt to retrieve pictures at a first terminal" to the second terminal 300. A user may recognize that there was an attempt to retrieve personal information based on the message displayed at the second terminal 300.

The designated input stated above in relation to the operation S2340 may vary according to various exemplary embodiments. For example, referring to FIG. 25, the another person 2420 may input a touch pattern 2500 to the first terminal 100, which is stolen by the another person 2420, to unlock a lock screen. If the first terminal 100 is determined to be stolen based on the first state, the second state, and the distance between the first terminal 100 and the second terminal 300, the first terminal 100 may transmit a message 2510, e.g., "a wrong pattern is input to the mobile phone," to the second terminal 300. The user 2410 may recognize that the another person 2420 attempted to unlock a lock screen of the first terminal 100 based on the message 2510 displayed at the second terminal 300.

Methods by which the first terminal 100 transmits the message 2510 to the second terminal 300 may vary according to various exemplary embodiments. For example, if a short-distance wireless communication is available between the first terminal 100 and the second terminal 300, the first terminal 100 may transmit the message 2510 to the second terminal 300 via the short-distance wireless communication. Alternatively, the first terminal 100 may transmit the message 2510 to the second terminal 300 via a separate network, such as a mobile communication network or the internet. However, one or more exemplary embodiments are not limited thereto.

Further, referring to FIG. 26, the designated input may be an input for accessing personal information regarding the user 2410 via the first terminal 100. Personal information regarding the user 2410 may include images, messages, financial information, and identification information stored in a terminal. However, one or more exemplary embodiments are not limited thereto. As shown in FIG. 26, if the another person 2420 selects an application execution icon for executing a finance-related application (in the case where the first terminal 100 is determined to be stolen), the first terminal 100 may transmit a message 2610, e.g., "there was an attempt to access personal information," to the second terminal 300. Methods by which the first terminal 100 transmits the message 2610 to the second terminal 300 may vary according to various exemplary embodiments.

Figure 27:
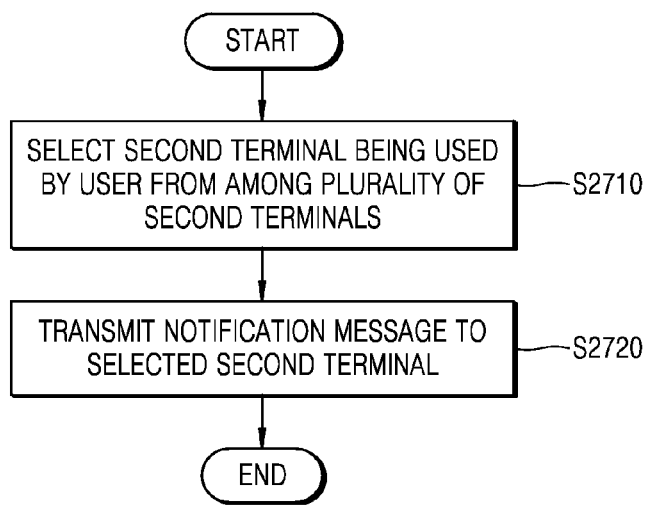
FIG. 27 is a flowchart showing a process in which the first terminal transmits a notification message to the second terminal, according to an exemplary embodiment.

FIG. 27 is a flowchart showing a process in which the first terminal 100 transmits a notification message to the second terminal 300, according to an exemplary embodiment. If an operation determined based on a first state, a second state, and a distance between the first terminal 100 and the second terminal 300 is an operation for transmitting a notification message, the first terminal 100 may transmit a notification message to a terminal that is being currently used by a user.

If an operation determined in the operation S530 (FIG. 5) based on a first state, a second state, and a distance between the first terminal 100 and the second terminal 300 is an operation for transmitting a notification message, the first terminal 100 may search for and select a second terminal that is being currently used by a user in an operation S2710.

Figure 28:
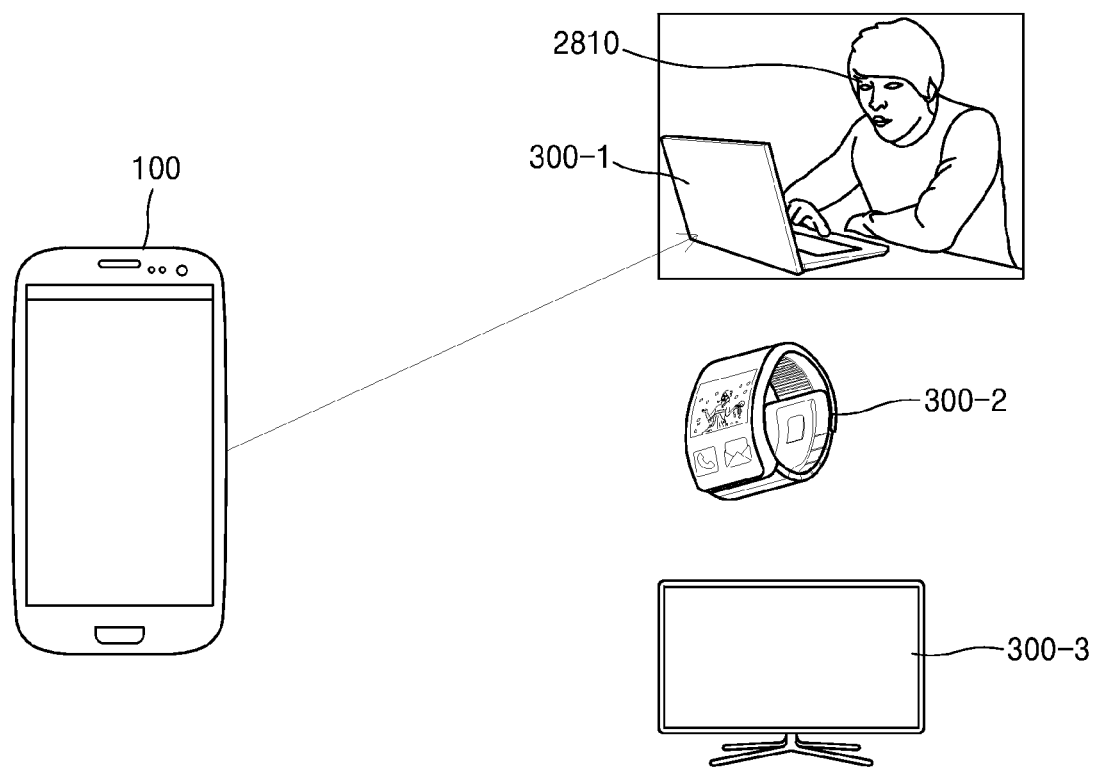
FIG. 28 is a diagram for describing an example that the first terminal transmits a notification message, according to an exemplary embodiment.

Referring to FIG. 28, the first terminal 100 may select (that is, search for) a terminal that is being currently used by a user 2810 from among terminals 300-1, 300-2, and 300-3. The terminals 300-1, 300-2, and 300-3 include terminals that the first terminal 100 may directly or indirectly communicate with. For example, the terminals 300-1, 300-2, and 300-3 may include terminals connected to the first terminal 100 via a short-distance wireless communication or terminals connected to a network to which the first terminal 100 is connected to. However, one or more exemplary embodiments are not limited thereto. Furthermore, the terminals 300-1, 300-2, and 300-3 may include the second terminal 300.

According to an exemplary embodiment, in the operation S2710, the first terminal 100 may transmit, to the terminals 300-1, 300-2, and 300-3, a search signal indicating information that a device being currently used by the user 2810 is being searched for. When the search signal is received, the terminal 300-1 being currently used by the user 2810 may transmit a response signal indicating that the user 2810 is currently using the terminal 300-1 to the first terminal 100. Alternatively, according to another exemplary embodiment, in the operation S2710, the first terminal 100 may access the terminals 300-1, 300-2, and 300-3 without transmitting a search signal. The first terminal 100 may analyze the terminals 300-1, 300-2, and 300-3 and search for the terminal 300-1 being used by the user 2810 from among the terminals 300-1, 300-2, and 300-3. For example, if a universal plug and play (UPnP) service may be designated by a UPnP protocol, and a terminal registered to the UPnP service may be considered as a terminal being currently used by a user. If a terminal being currently used by a user is not found, the first terminal 100 may search for a shared network that the first terminal 100 may access and search for a terminal being currently used by the user by using the shared network. Alternatively, the first terminal 100 may search for a terminal being currently used by the user by scanning terminals included in a terminal list database included in the first terminal 100.

Next, the first terminal 100 may transmit a notification message to the terminal selected in the operation S2710 (operation S2720). According to an exemplary embodiment, if no response message is received from a terminal to which a notification message is transmitted within a designated time period after the notification message is transmitted, the first terminal 100 may select another terminal and re-transmit a notification message to the newly selected terminal.

Figure 29:
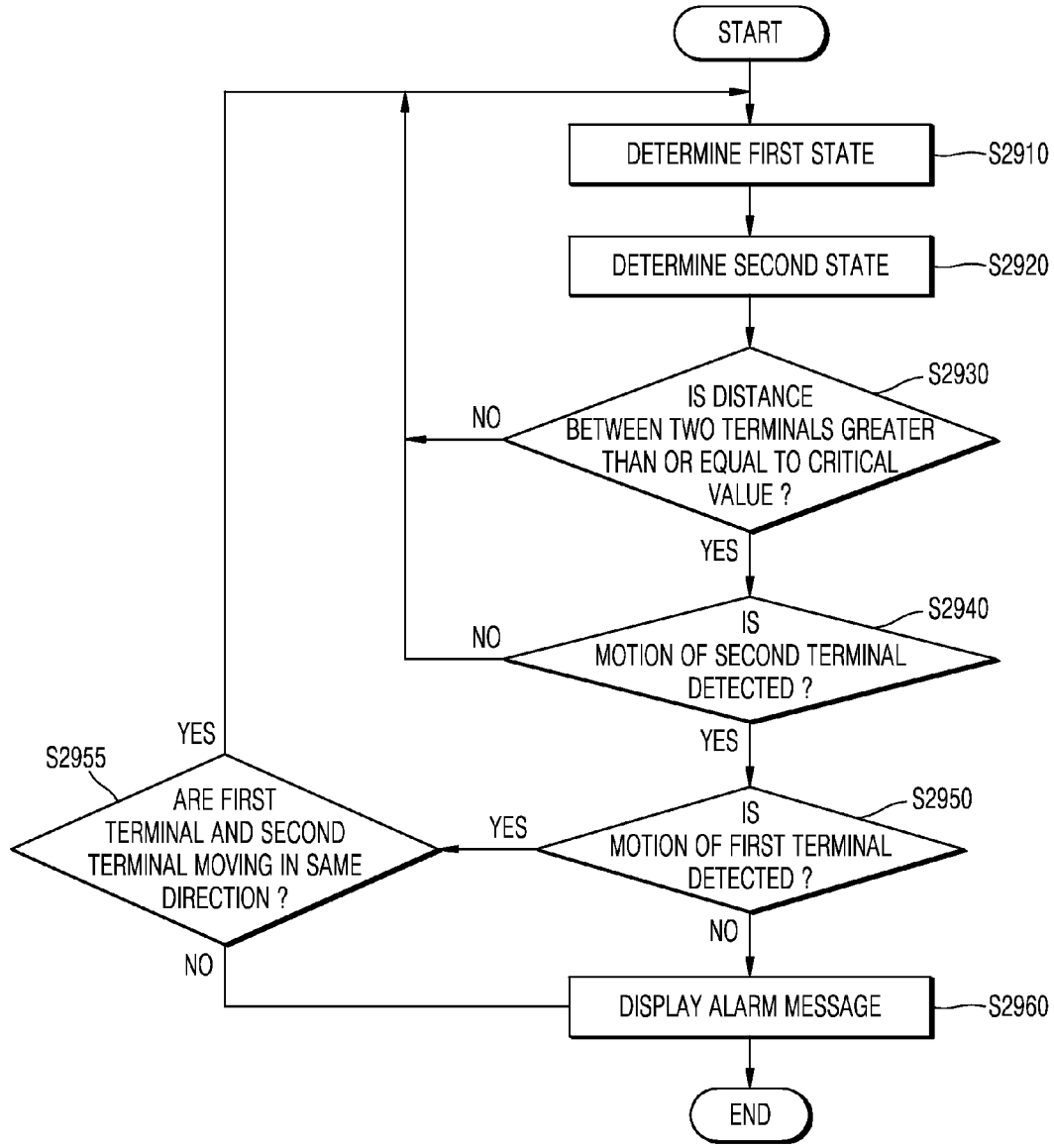
FIG. 29 is a flowchart showing a process in which the first terminal operates, according to another exemplary embodiment.
Figure 30:
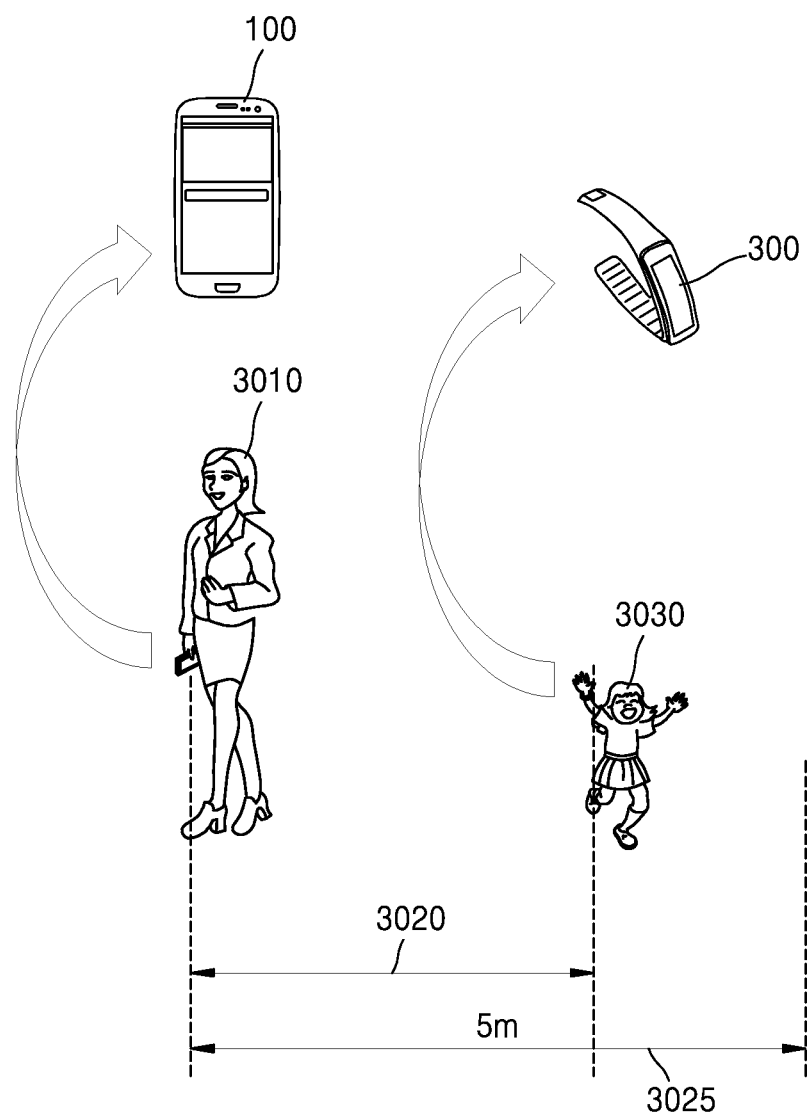
FIGS. 30 through 33 are diagrams showing methods of using the first terminal and the second terminal for lost child prevention according to various exemplary embodiments.

FIG. 29 is a flowchart showing a process in which the first terminal 100 operates according to another exemplary embodiment. Furthermore, FIGS. 30 through 33 are diagrams showing methods of using the first terminal 100 and the first terminal 300 for lost child prevention based on the exemplary embodiment shown in FIG. 29. However, the exemplary embodiments shown in FIGS. 30 through 33 are merely non-limiting examples.

In an operation S2910, the first terminal 100 may determine a first state indicating a state of the first terminal 100. For example, the first state may include a motion of the first terminal 100, a direction in which the first terminal 100 is moving, or a pattern of motions of the first terminal 100. The first state may correspond to first sensor information. For example, the first terminal 100 may determine a direction in which the first terminal 100 is moving by using the GPS device 140 of the first terminal 100 or a geomagnetic sensor of the sensor 110. In the case of using the GPS device 140, the first terminal 100 may periodically obtain a location of the first terminal 100. Alternatively, the first terminal 100 may obtain a location of the first terminal 100 when an event occurs. The event may refer to an operation or an event occurring with respect to the first terminal 100. For example, if a motion of the first terminal 100 is detected by using an acceleration sensor, the first terminal 100 may obtain a location of the first terminal 100. Next, based on a change of location of the first terminal 100, the first terminal 100 may determine a direction in which the first terminal 100 is moving. Alternatively, in the case of using the geomagnetic sensor, the first terminal 100 may periodically obtain an azimuth angle of the first terminal 100. Alternatively, the first terminal 100 may obtain an azimuth angle of the first terminal 100 when an event occurs. The azimuth angle may be an angle between a baseline of the N pole of the Earth's magnetic field and a direction that the first terminal 100 faces. Next, based on a change in the azimuth angle of the first terminal 100, the first terminal 100 may determine the direction in which the first terminal 100 is moving.

Furthermore, in an operation S2920, the second terminal 300 may determine a second state indicating a state of the second terminal 300. For example, the second state may include a motion of the second terminal 300, a direction in which the second terminal 300 is moving, or a pattern of motions of the second terminal 300. The second state may correspond to second sensor information.

For example, the second terminal 300 may determine a direction in which the second terminal 300 is moving by using the GPS device 340 of the second terminal 300 or a geomagnetic sensor of the sensor 310. A method by which the second terminal 300 determine a moving direction by using the GPS device 340 or the geomagnetic sensor is similar to the method described above with reference to the first terminal 100.

In an operation S2930, the first terminal 100 may determine whether a distance between the first terminal 100 and the second terminal 300 is greater than or equal to a critical value. FIGS. 30 through 33 are diagrams showing an exemplary embodiment corresponding to the case in which a first user 3010 possesses the first terminal 100, which is a mobile phone, and a second user 3030 is wearing the second terminal 300, which is a wearable device. The first terminal 100 may determine a distance 3020 between the first terminal 100 and the second terminal 300. The first terminal 100 may determine whether the distance 3020 is less than a critical value 3025 (e.g., 5 m). The critical value 3025 may also be set based on a user-input value input to the first terminal 100. If the distance 3020 is less than the critical value 3025 (S2930-N), the first terminal 100 may not perform any particular operation and may again perform the operation S2910 after an arbitrary time period has elapsed. In other words, if the second user 3030 is within a critical distance from the first user 3010, the first terminal 100 may not perform any additional operation other than an operation for periodically monitoring a first state and a second state.

If the distance 3020 between the first terminal 100 and the second terminal 300 is greater than or equal to the critical value 3025 (S2930-Y), the first terminal 100 may determine in an operation S2940 whether the second state indicates that a motion of the second terminal 300 is detected. If no motion of the second terminal 300 is detected, the second user 3030 is not moving (S2940-N), and thus the first terminal 100 may not perform any particular operation and may again perform the operation S2910 after an arbitrary time period has elapsed. However, if the second state indicates that a motion of the second terminal 300 is detected (S2940-Y), the first terminal 100 may determine in an operation S2950 whether the first state indicates that a motion of the first terminal 100 is detected. Detection of a motion of a terminal may mean that first sensor information or second sensor information may include information regarding a pattern in which a terminal moves.

Figure 31:
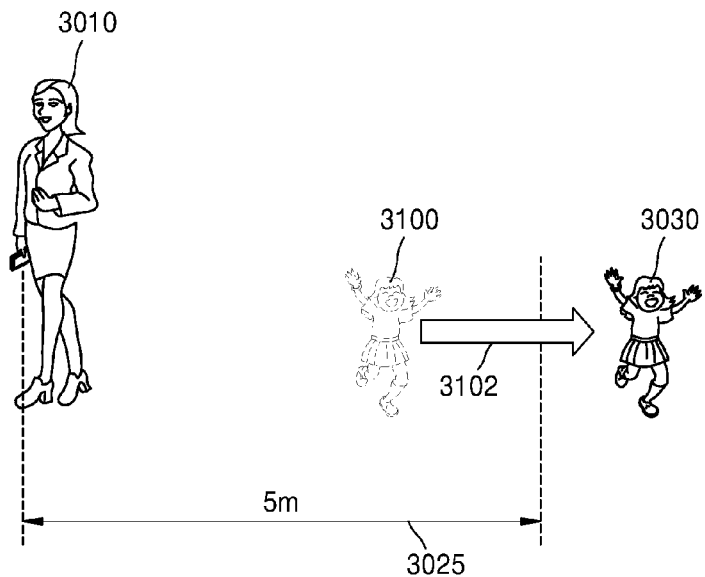

If a motion of the second terminal 300 is detected and no motion of the first terminal 100 is detected (S2950-N), the first terminal 100 may display a notification message (operation S2960). The notification message may be a message, which instructs the first user 3010 to check a location of the child 3030. Referring to FIG. 31, when the first user 3010 is not moving and the second user 3030 moves from a previous location 3100 in a direction 3102, a distance between the two terminals may be greater than or equal to the critical value 3025. In this case, the second user 3030 may move away from the first user 3010 without the first user 3010 realizing it, the first terminal 100 may output a notification message for lost child prevention.

Figure 32:
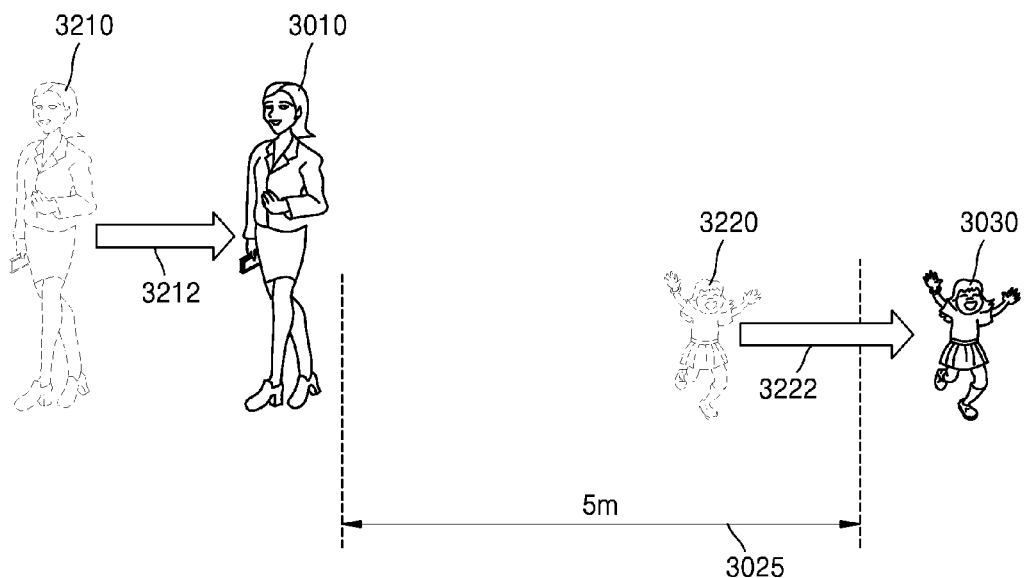

If a motion of the first terminal 100 is detected in the operation S2950, the first terminal 100 may determine in an operation S2955 whether the first terminal 100 and the second terminal 300 are moving in a same direction. The expression "moving in a same direction" includes the expression "moving in similar directions." If the first terminal 100 and the second terminal 300 are moving in a same direction (S2955-Y), the first terminal 100 may not perform any particular operation and may again perform the operation S2910 after an arbitrary time period has elapsed. Referring to FIG. 32, as the second user 3030 moves from a previous location 3220 in a direction 3222, a distance from the first user 3010 to the second user 3030 is greater than the critical value 3025. However, if a direction 3212 in which the first user 3010 from an original location 3210 is identical to the direction 3222 in which the second user 3030 is moving, the first user 3010 and the second user 3030 are moving in a same direction, and, thus, the first terminal 100 may not display a lost child prevention message.

Figure 33:
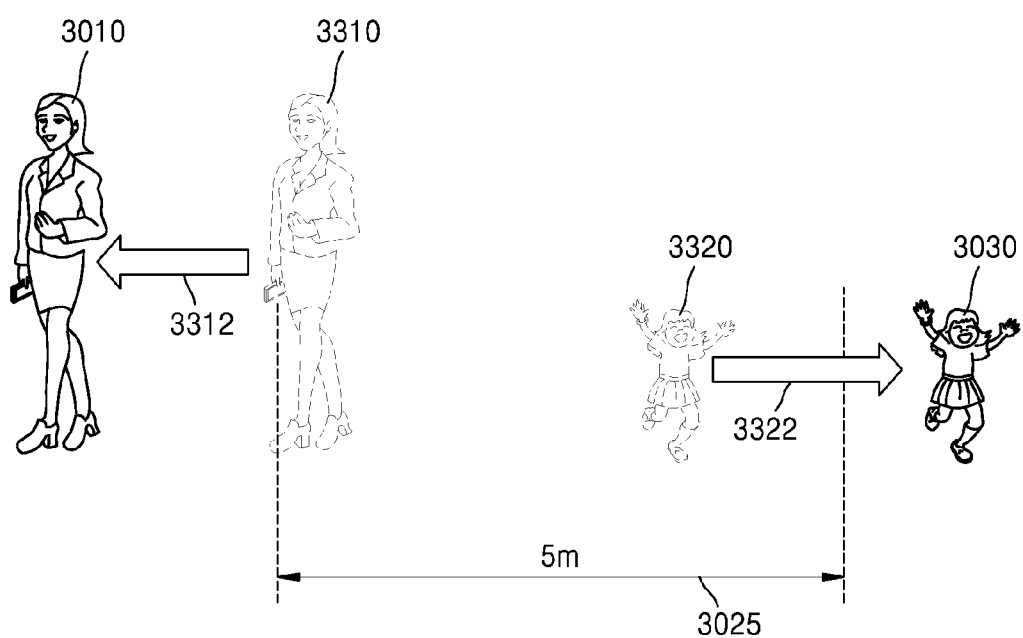

If the first terminal 100 and the second terminal 300 are not moving in a same direction in the operation S2955, the first terminal 100 may display a notification message (operation S2960). Referring to FIG. 33, as the second user 3030 moves from an original location 3320 in a direction 3322, a distance from the first user 3010 to the second user 3030 is greater than the critical value 3025. Since a direction 3312 in which the first user 3010 is moving from an original location 3310 is different from the direction 3322 in which the second user 3030 is moving from the original location 3320, the first terminal 100 should display a notification message for lost child prevention to the first user 3010.

Figure 34:
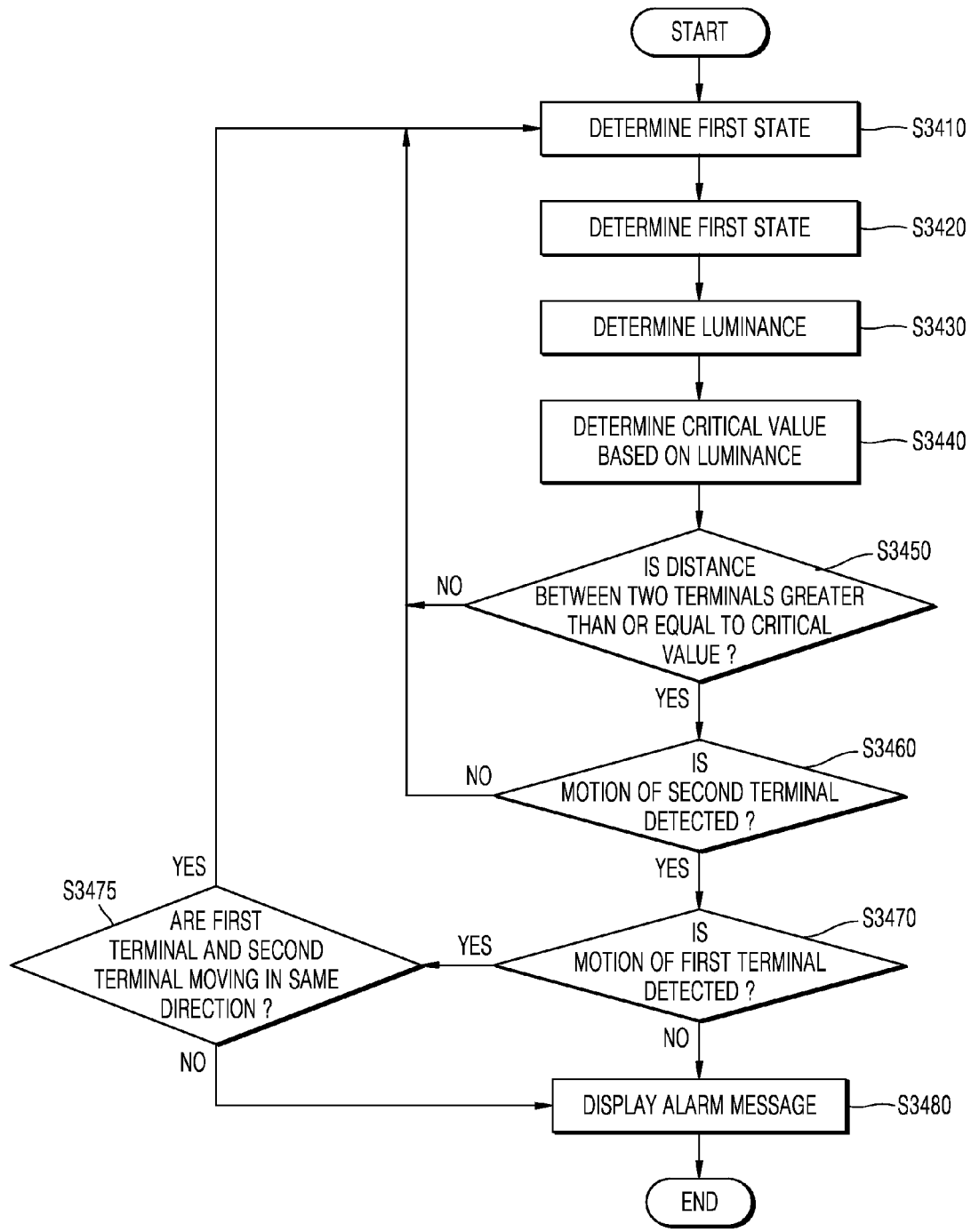
FIG. 34 is a flowchart showing a process in which the first terminal operates, according to another exemplary embodiment.

FIG. 34 is a flowchart showing a process in which the first terminal 100 operates according to another exemplary embodiment, and FIGS. 35 through 38 are diagrams showings a method of using the first terminal 100 and the second terminal 300 for lost child prevention based on ambient luminance, according to the exemplary embodiment shown in FIG. 34. When an ambient environment is bright, even if a child with the second terminal 300 moves away from a parent with the first terminal 100, the parent may easily locate the child. Therefore, a critical value of a distance between the first terminal 100 and the second terminal 300 may be relatively large during periods of relatively high luminance, such as daytime. However, when the ambient environment is dark, even if a distance between the parent with the first terminal 100 and the child with the second terminal 300 is relatively small, the parent may have difficulty locating the child. Therefore, a critical value of a distance between the first terminal 100 and the second terminal 300 may be relatively small during periods of relatively low luminance, such as at night. In this case, a notification message may be output to the parent even if the child moves away from the parent for a relatively small distance.

In an operation S3410, the first terminal 100 may determine a first state indicating a state of the first terminal 100. In an operation S3420, the second terminal 300 may determine a second state indicating a state of the second terminal 300.

In an operation S3430, the first terminal 100 may determine a luminance around the first terminal 100 by using the luminance sensor of the sensor 110. Alternatively or additionally, the second terminal 300 may determine a luminance around the second terminal 300 by using the luminance sensor of the sensor 310.

In an operation S3440, the first terminal 100 may determine a critical value of a distance between the first terminal 100 and the second terminal 300 based on the determined luminance. For example, if the luminance determined by the first terminal 100 is more than 10 lux, the critical value of the distance between the first terminal 100 and the second terminal 300 may be about 5 m. Alternatively, if the luminance determined by the first terminal 100 is between 1 lux and 10 lux, the critical value of the distance between the first terminal 100 and the second terminal 300 may be about 4 m. Alternatively, if the luminance determined by the first terminal 100 is less than or equal to 1 lux, the critical value of the distance between the first terminal 100 and the second terminal 300 may be about 3 m.

The first terminal 100 may determine the critical value based on at least one of a luminance around the first terminal 100 and a luminance around the second terminal 300. For example, the first terminal 100 may determine the critical value based on a smaller value between, an average of, or a median value of the luminance around the first terminal 100 and the luminance around the second terminal 300. In another example, the second terminal 300 may select a smaller value between, an average of, or a median value of the luminance around the first terminal 100 and the luminance around the second terminal 300 and provide the selected value to the first terminal 100.

Figure 35:
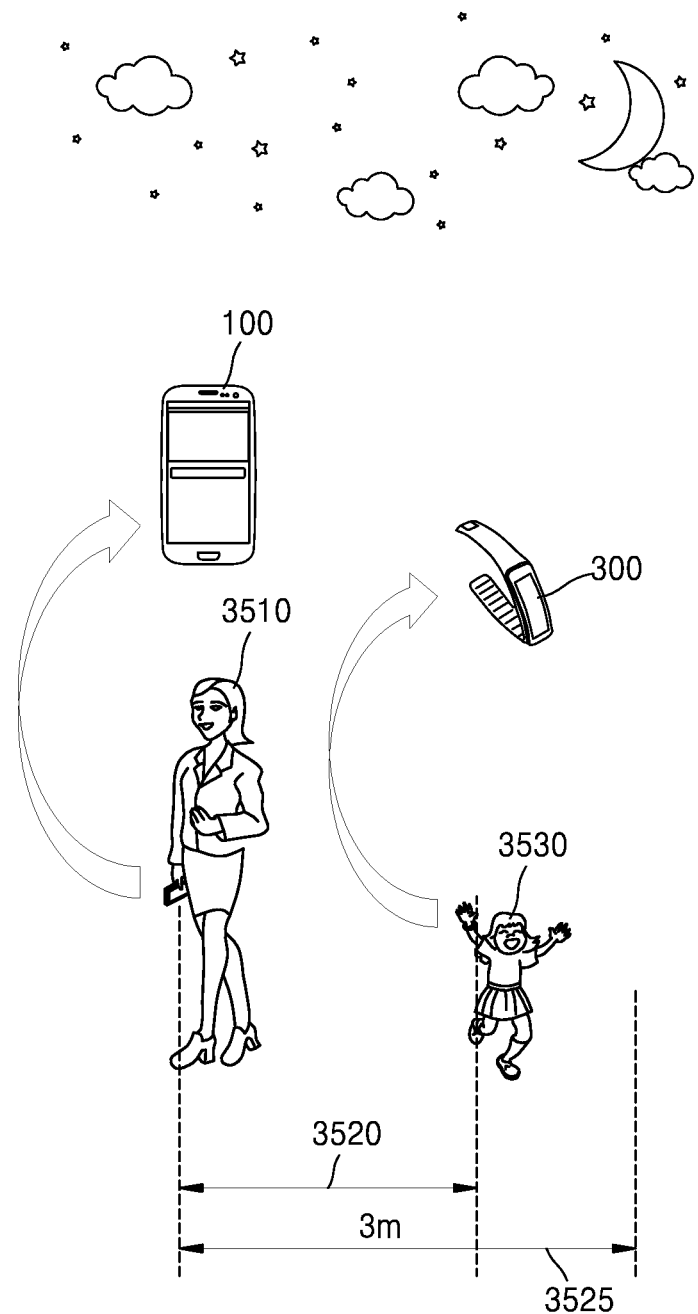
FIGS. 35 through 38 are diagram showings a method of using a first terminal and a second terminal for lost child prevention, according to various exemplary embodiments.

In an operation S3450, the first terminal 100 may determine whether the distance between the first terminal 100 and the second terminal 300 is less than or equal to the determined critical value. FIG. 35 is a diagram showing an exemplary embodiment corresponding to the case in which the determined critical value is 3 m, a first user 3510 possesses the first terminal 100, which is a mobile phone, and a second user 3530 is wearing the second terminal 300, which is a wearable device. The first terminal 100 may determine a distance 3520 between the first terminal 100 and the second terminal 300. The first terminal 100 may determine whether the distance 3520 between the first terminal 100 and the second terminal 300 is less than or equal to a critical value 3525 (e.g., 3 m). If the distance 3520 between the first terminal 100 and the second terminal 300 is less than the critical value 3525 (S3450-N), the first terminal 100 may not perform any particular operation and may again perform the operation S3410 after an arbitrary time period has elapsed, If the distance 3520 between the first terminal 100 and the second terminal 300 is greater than or equal to the critical value 3525 (S3450-Y), the first terminal 100 may determine whether the second state indicates that a motion of the second terminal 300 is detected. If no motion of the second terminal 300 is detected (S3460-N), the second user 3530 is not moving, and thus the first terminal 100 may not perform any particular operation. Furthermore, the first terminal 100 may again perform the operation S3410 after an arbitrary time period has elapsed. However, if a motion of the second terminal 300 is detected (S3460-Y), the first terminal 100 may determine in an operation S3470 whether the first state indicates that a motion of the first terminal 100.

Figure 36:
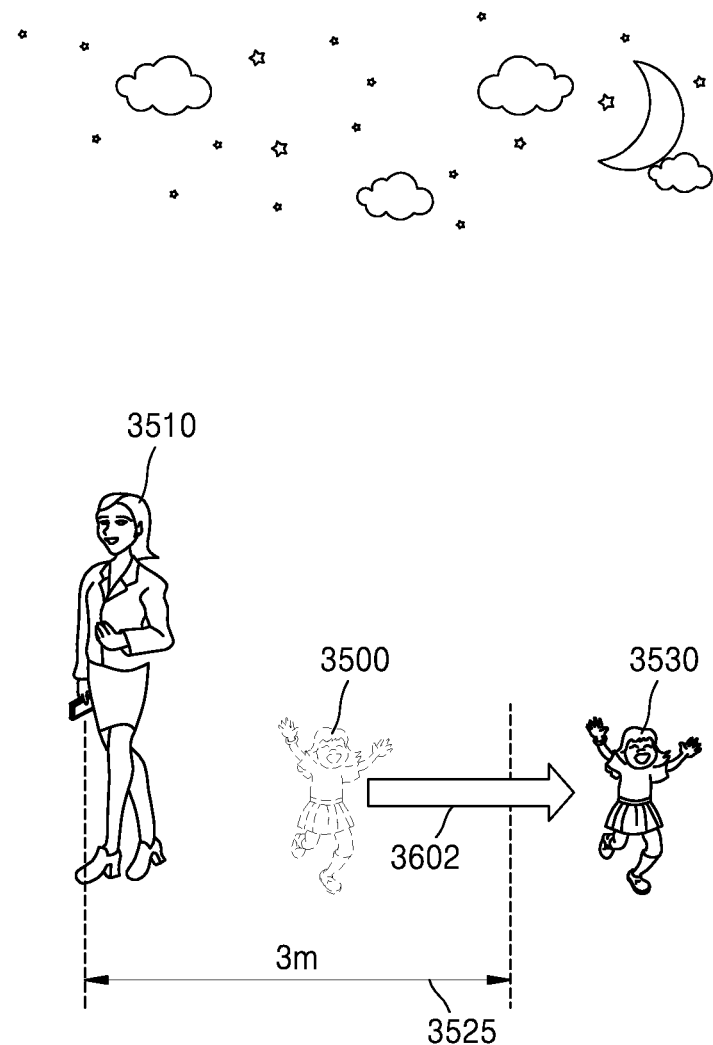

If a motion of the second terminal 300 is detected and no motion of the first terminal 100 is detected (S3470-N), the first terminal 100 may display a notification message (operation S3480). The notification message may be a message that instructs the first user 3510 to check a location of the child. Referring to FIG. 36, when the first user 3510 is not moving and the second user 3530 moves from a previous location 3500 in a direction 3602, a distance between the two terminals may be greater than or equal to the critical value 3525. In this case, the second user 3530 may move away from the first user 3510 without the first user 3510 realizing it, and the first terminal 100 may output a notification message for lost child prevention.

Figure 37:
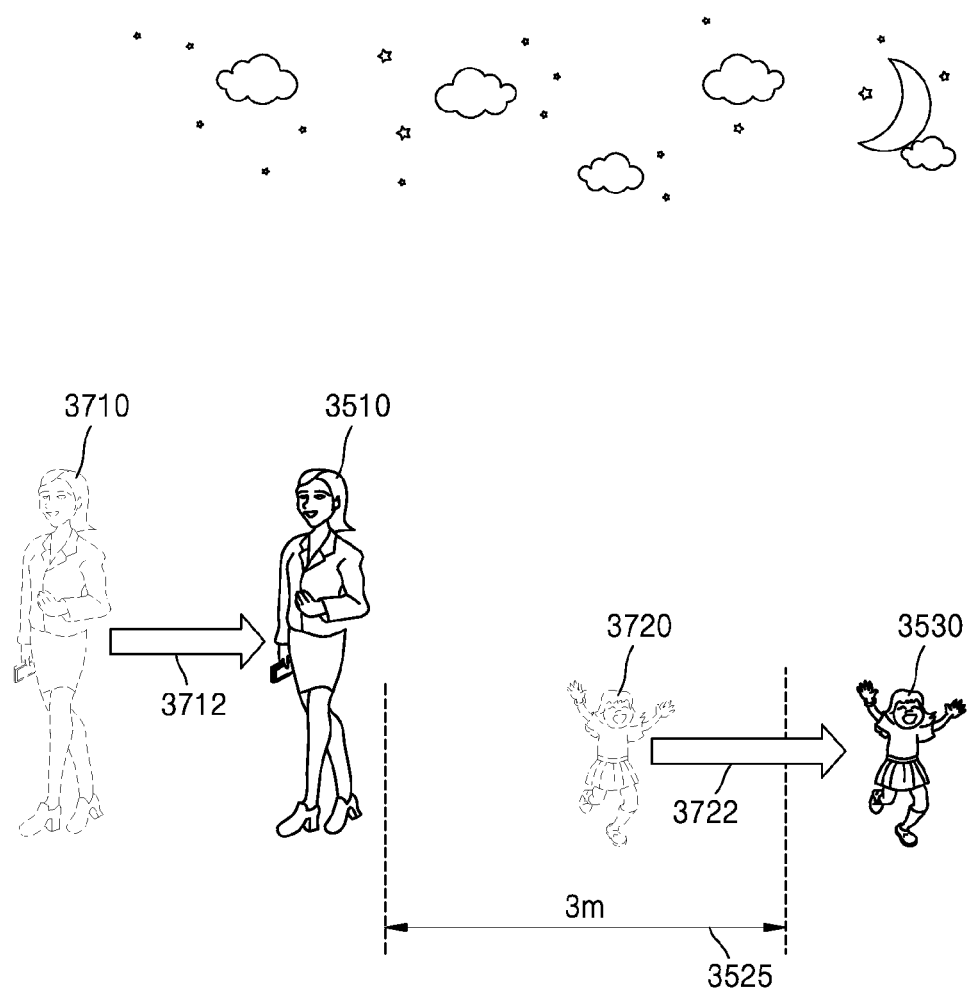

If a motion of the first terminal 100 is detected in the operation S3470, the first terminal 100 may determine in an operation S3475 whether the first terminal 100 and the second terminal 300 are moving in a same or similar direction. If the first terminal 100 and the second terminal 300 are moving in a same or similar direction (S3475-Y), the first terminal 100 may not perform any particular operation and may again perform the operation S3410 after an arbitrary time period has elapsed. Referring to FIG. 37, FIG. 37 shows that, as the second user 3530 moved from a previous location 3720 in a direction 3722, a distance from the first user 3510 to the second user 3530 is greater than the critical value 3525. However, if a direction 3712 in which the first user 3510 from an original location 3710 is identical or similar to the direction 3722 in which the second user 3530 is moving, the first user 3510 and the second user 3530 are moving in a same direction, and, thus, the first terminal 100 may not display a lost child prevention message.

Figure 38:
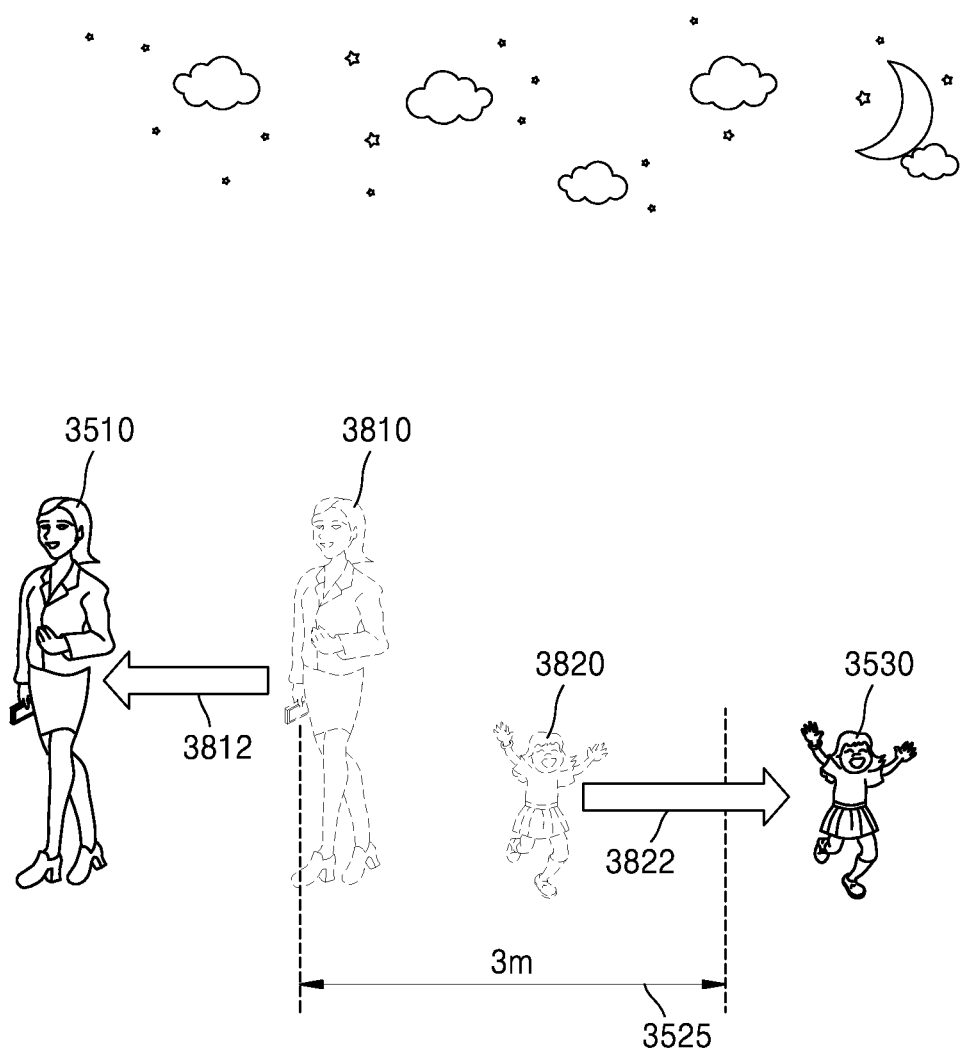

If the first terminal 100 and the second terminal 300 are not moving in a same direction in the operation S3475, the first terminal 100 may display a notification message (operation S3480). Referring to FIG. 38, FIG. 38 shows that, as the second user 3530 moved from an original location 3870 in a direction 3822, a distance from the first user 3510 to the second user 3530 is greater than the critical value 3525. Since a direction 3812 in which the first user 3510 is moving from an original location 3810 is different from the direction 3822 in which the second user 3530 is moving, the first terminal 100 should display a notification message for lost child prevention to the first user 3510.

Figure 39:
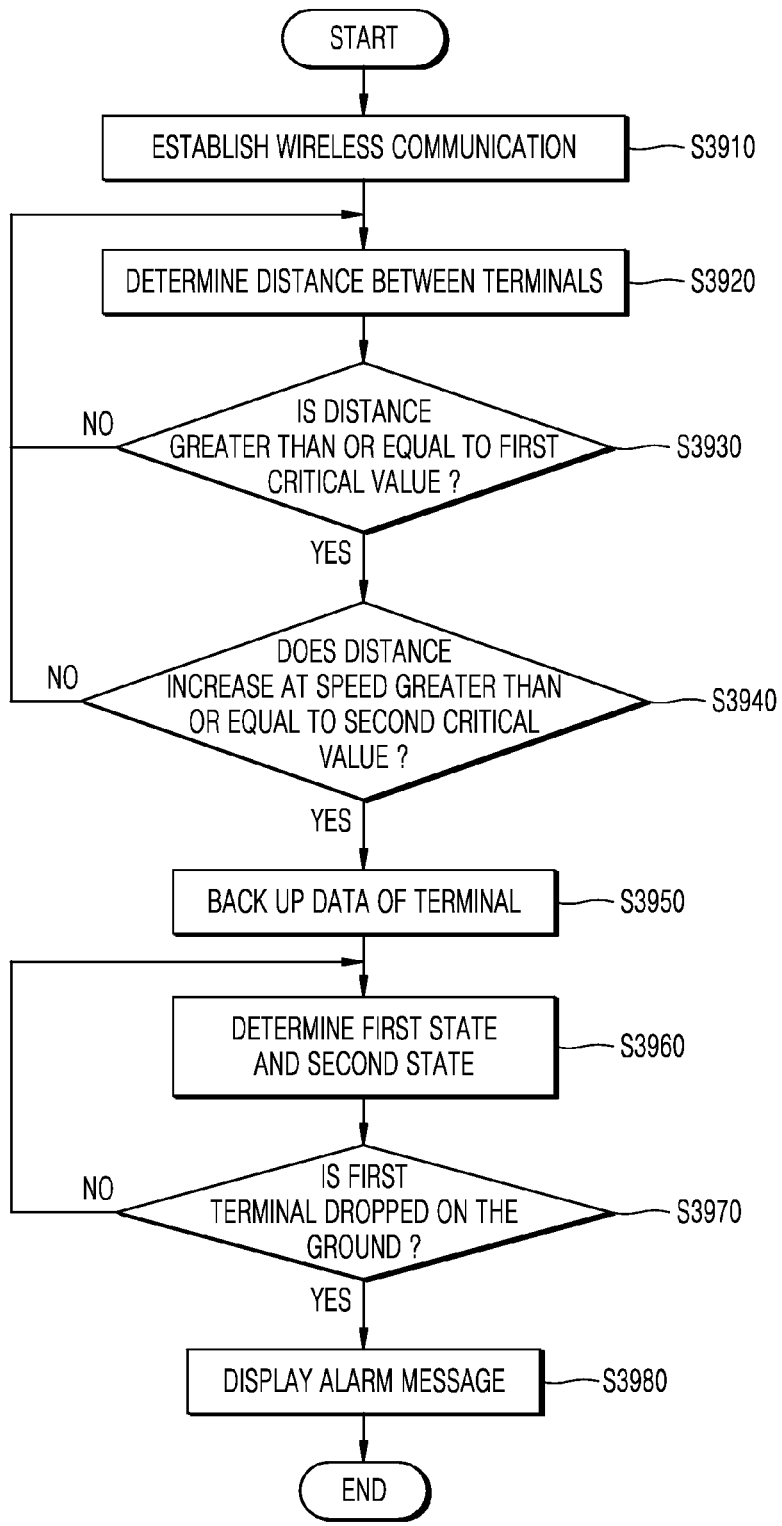
FIG. 39 is a flowchart showing a process of displaying a notification message on the second terminal, according to another exemplary embodiment.
Figure 40:
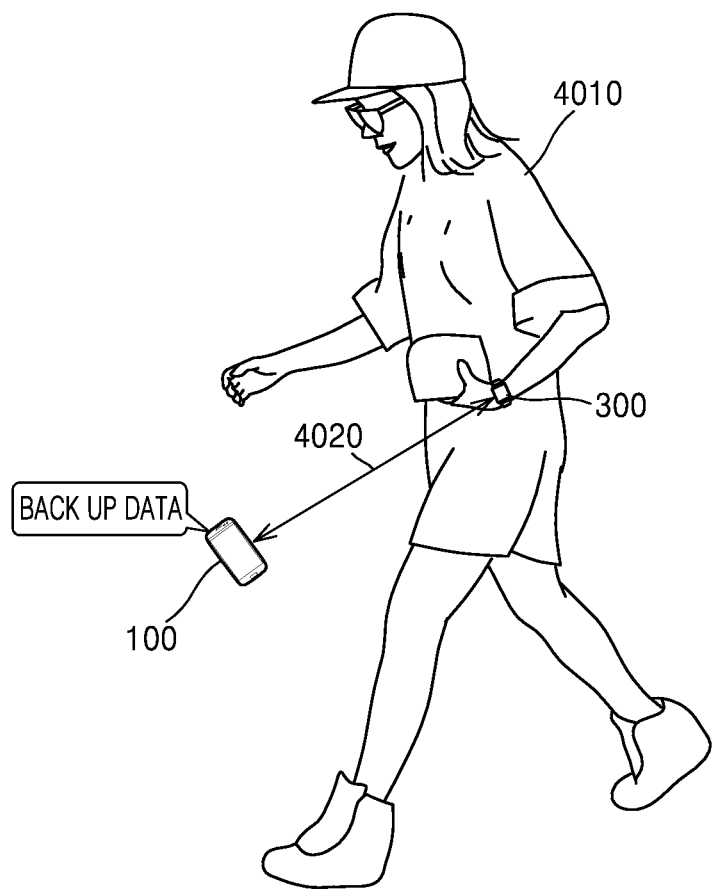
FIGS. 40 and 41 are diagrams for describing an example that the second terminal displays a notification message, according to various exemplary embodiments.
Figure 41:
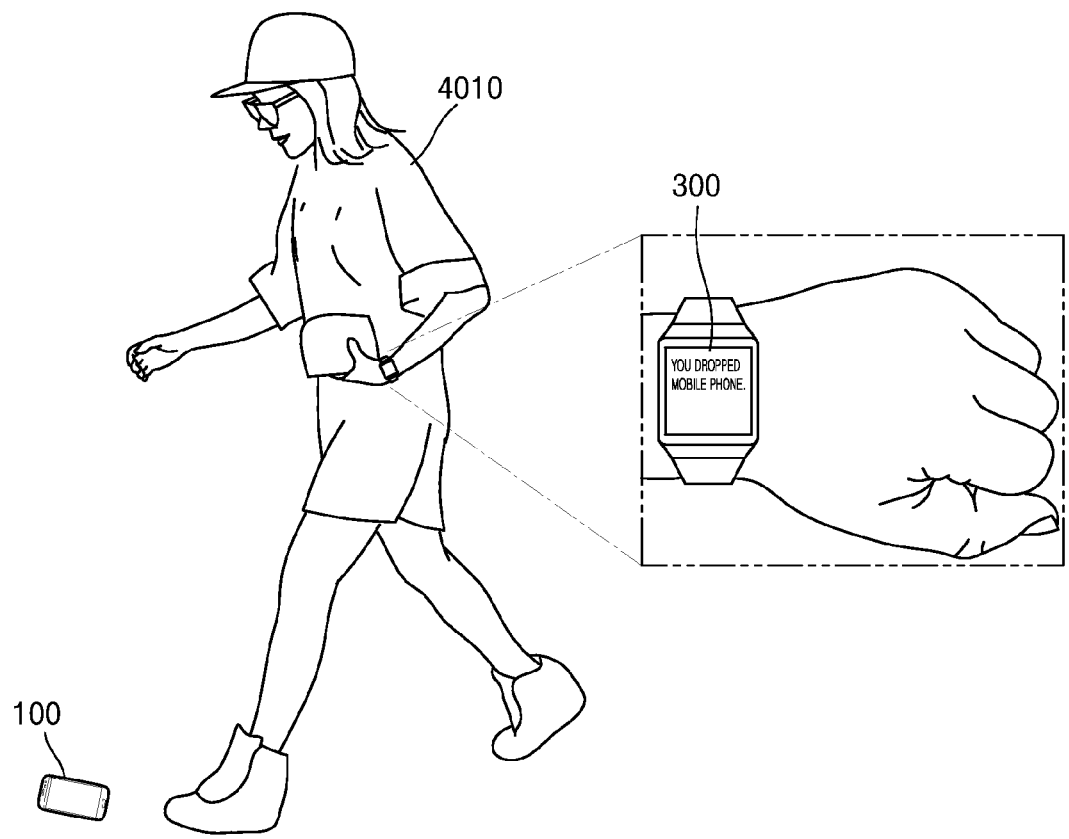

FIG. 39 is a flowchart showing a process of displaying a notification message on the second terminal 300, according to another exemplary embodiment. According to an exemplary embodiment, if a user drops the first terminal 100, a notification message may be displayed at the second terminal 300 possessed or worn by the user. Alternatively, before the user drops the first terminal 100, an operation for preparing for a case that a shock is applied to the first terminal 100 (e.g., an operation for storing backup data of the first terminal 100) may be performed. FIGS. 40 and 41 are diagrams for describing an example that the second terminal 300 displays a notification message according to the exemplary embodiment shown in FIG. 39.

Referring to FIG. 39, in an operation S3910, the first terminal 100 may establish a short-distance wireless communication with the second terminal 300. Next, in an operation S3920, the first terminal 100 may determine a distance between the first terminal 100 and the second terminal 300 based on the established short-distance wireless communication.

Next, in an operation S3930, the first terminal 100 or the second terminal 300 may determine whether the distance between the first terminal 100 and the second terminal 300 is greater than or equal to a first critical value.

If the distance between the first terminal 100 and the second terminal 300 is greater than or equal to the first critical value (S3930-Y), the first terminal 100 or the second terminal 300 may determine whether the distance between the first terminal 100 and the second terminal 300 increases at a speed greater than or equal to a second critical value in an operation S3940.

If the distance between the first terminal 100 and the second terminal 300 increases at a speed greater than or equal to the second critical value (S3940-Y), the first terminal 100 may back up data of the first terminal 100 in an operation S3950. For example, the first terminal 100 may store data (content data or application data) being executed on the first terminal 100 and data being input to the first terminal 100 by a user to the storage 170 of the first terminal 100. Alternatively, the first terminal 100 may provide the above-stated data to the second terminal 300 or an external device (e.g., a cloud device).

FIG. 40 shows an exemplary embodiment corresponding to the case in which the first terminal 100 is a mobile phone and the second terminal 300 is a wearable device that may be worn on a wrist of a user 4010. In FIG. 40, if the user 4010 drops the first terminal 100, a distance 4020 between the first terminal 100 and the second terminal 300 may rapidly increase. If the distance 4020 between the first terminal 100 and the second terminal 300 increases at a speed greater than or equal to the second critical value, the first terminal 100 may back up data of the first terminal 100 to prevent loss of the data.

In an operation S3960, the first terminal 100 or the second terminal 300 may determine at least one of a first state and a second state. Next, in an operation S3970, the first terminal 100 or the second terminal 300 may determine whether the first terminal 100 is dropped on the ground based on at least one of the first state and the second state. If the first terminal 100 is determined to be dropped (S3970-Y), the second terminal 300 may display a notification message indicating that the first terminal 100 is dropped, in an operation S3970. For example, as shown in FIG. 41, the user 4010 drops the first terminal 100 on the ground, the first state indicates that the first terminal 100 is dropped on the ground and a particular amount of shock is applied to the first terminal 100, and the second state indicates whether the user 4010 possessing the second terminal 300 is moving. In this case, the first terminal 100 may determine that the user 4010 dropped the first terminal 100 and transmit a notification message indicating that the user 4010 dropped the first terminal 100 to the second terminal 300. Alternatively, the second terminal 300 may determine that the user 4010 dropped the first terminal 100 and display a notification message indicating that the first terminal 100 is dropped.

One or more exemplary embodiments may be implemented by a computer-readable recording medium, such as a program module executed by a computer. The computer-readable recording medium may be a non-transitory computer-readable recording medium. The computer-readable recording medium may be an arbitrary available medium accessible by a computer, and examples thereof include all volatile media (e.g., RAM) and non-volatile media (e.g., ROM) and separable and non-separable media. Further, examples of the computer-readable recording medium may include a computer storage medium and a communication medium. Examples of the computer storage medium include all volatile and non-volatile media and separable and non-separable media, which have been implemented by an arbitrary method or technology, for storing information such as computer-readable commands, data structures, program modules, and other data. The communication medium typically include a computer-readable command, a data structure, a program module, other data of a modulated data signal, or another transmission mechanism, and an example thereof includes an arbitrary information transmission medium. For example, the computer-readable recording medium may be ROM, RAM, a flash memory, a CD, a DVD, a magnetic disk, or a magnetic tape.

While one or more exemplary embodiments have been particularly shown and described, it will be understood by those of ordinary skill in the art that various changes in form and details may be made therein without departing from the spirit and scope of the inventive concept as defined by the following claims and their equivalents. Hence, it will be understood that the exemplary embodiments described above are not limiting to the scope of the inventive concept. For example, each component described as a single unit may be executed in a distributed manner, and components described distributed may be executed in an integrated form.

The scope of the inventive concept is indicated by the claims and their equivalents which will be described in the following rather than the detailed description of certain exemplary embodiments, and it should be understood that the claims and all modifications or modified forms drawn from the concept of the claims and their equivalents are included in the scope of the inventive concept.

What is claimed is:

1. A first electronic device for operating in an information protection mode, the first electronic device comprising:
    a communicator configured to communicate with a second electronic device; and
    a controller configured to, based on a signal strength of a signal transmitted to the second electronic device by the communicator or a signal strength of a signal from the second electronic device received by the communicator, control the first electronic device to operate in the information protection mode.

2. The first electronic device according to claim 1, wherein the controller is further configured to, when the first electronic device operates in the information protection mode, control operations of the first electronic device based on state information of the first electronic device and state information of the second electronic device.

3. The first electronic device according to claim 1, wherein the controller is further configured to, when the first electronic device operates in the information protection mode and in response to an attempt to unlock the first electronic device, control the communicator to transmit a notification of the attempt to unlock the first electronic device.

4. The first electronic device according to claim 1, wherein
    the second electronic device comprises a wearable device, and
    the controller is further configured to, in response to a determination that the wearable device is not being worn by a user, end a communication between the communicator and the wearable device.

5. The first electronic device according to claim 2, wherein
    the state information of the first electronic device corresponds to movement of the first electronic device, and
    the state information of the second electronic device corresponds to movement of the second electronic device.

6. A non-transitory computer-readable medium having stored thereon instructions executable by a first electronic device to cause the first electronic device to perform:
    controlling to communicate with a second electronic device by a communicator; and
    controlling to operate in an information protection mode based on a signal strength of a signal transmitted to the second electronic device by the communicator or a signal strength of a signal from the second electronic device received by the communicator.

* * * * *